United States Patent [19]

Glassner

[11] Patent Number: 5,428,717
[45] Date of Patent: Jun. 27, 1995

[54] METHODS FOR CONVERTING CONCAVE POLYHEDRA TO THEIR CONVEX HULLS

[75] Inventor: Andrew S. Glassner, San Francisco, Calif.

[73] Assignee: Xerox Corporation, Stamford, Conn.

[21] Appl. No.: 814,165

[22] Filed: Dec. 30, 1991

[51] Int. Cl.[6] ............................................. G06T 17/00
[52] U.S. Cl. .................................. 395/123; 395/119; 395/120
[58] Field of Search ................. 395/119, 120, 123–129, 395/133, 136, 140–143

[56] References Cited

U.S. PATENT DOCUMENTS

| | | | |
|---|---|---|---|
| 4,901,251 | 2/1990 | Sfarti | 395/129 |
| 4,941,114 | 7/1990 | Shigyo et al. | 395/123 X |
| 4,962,468 | 10/1990 | Beauregard et al. | 395/129 |
| 4,974,177 | 11/1990 | Nishiguchi | 395/125 |
| 5,115,479 | 5/1992 | Murayama | 382/56 |
| 5,129,051 | 7/1992 | Cain | 395/133 |
| 5,189,626 | 2/1993 | Colburn | 395/120 X |

OTHER PUBLICATIONS

Kaul et al., "Research Report: Solid–Interpolating Deformations: Construction and Animation of Pips", IBM Research Division, Sep. 1991, pp. 1–30.
Kent et al, "Establishing Correspondences by Topological Merging: A New Approach to 3-D Shape Transformation", Graphics Interface '91, Jun. 1991, pp. 271–278.

Primary Examiner—Almis R. Jankus
Attorney, Agent, or Firm—Oliff & Berridge

[57] ABSTRACT

Methods for modifying shapes for display, represented as non-self-intersecting, simply connected, triangulated polyhedron of genus-0, defined as a plurality of triangular faces, each triangular face defined as a set of three coordinate points, eliminate concave edges in the shapes by performing pop or slide procedures on the concave edges. These procedures result in a visually smooth transformation of the concave shape to its convex hull, or to other shapes located therebetween.

16 Claims, 24 Drawing Sheets

| VERTEX LIST |
|---|
| $P_0$: (x,y,z) |
| $P_1$: (x,y,z) |
| $P_2$: (x,y,z) |
| $P_3$: (x,y,z) |

FIG. 11B

| FACE LIST |
|---|
| $F_0$: $(P_0, P_2, P_3)$ |
| $F_1$: $(P_0, P_3, P_1)$ |
| $F_2$: $(P_0, P_1, P_2)$ |

FIG. 11C

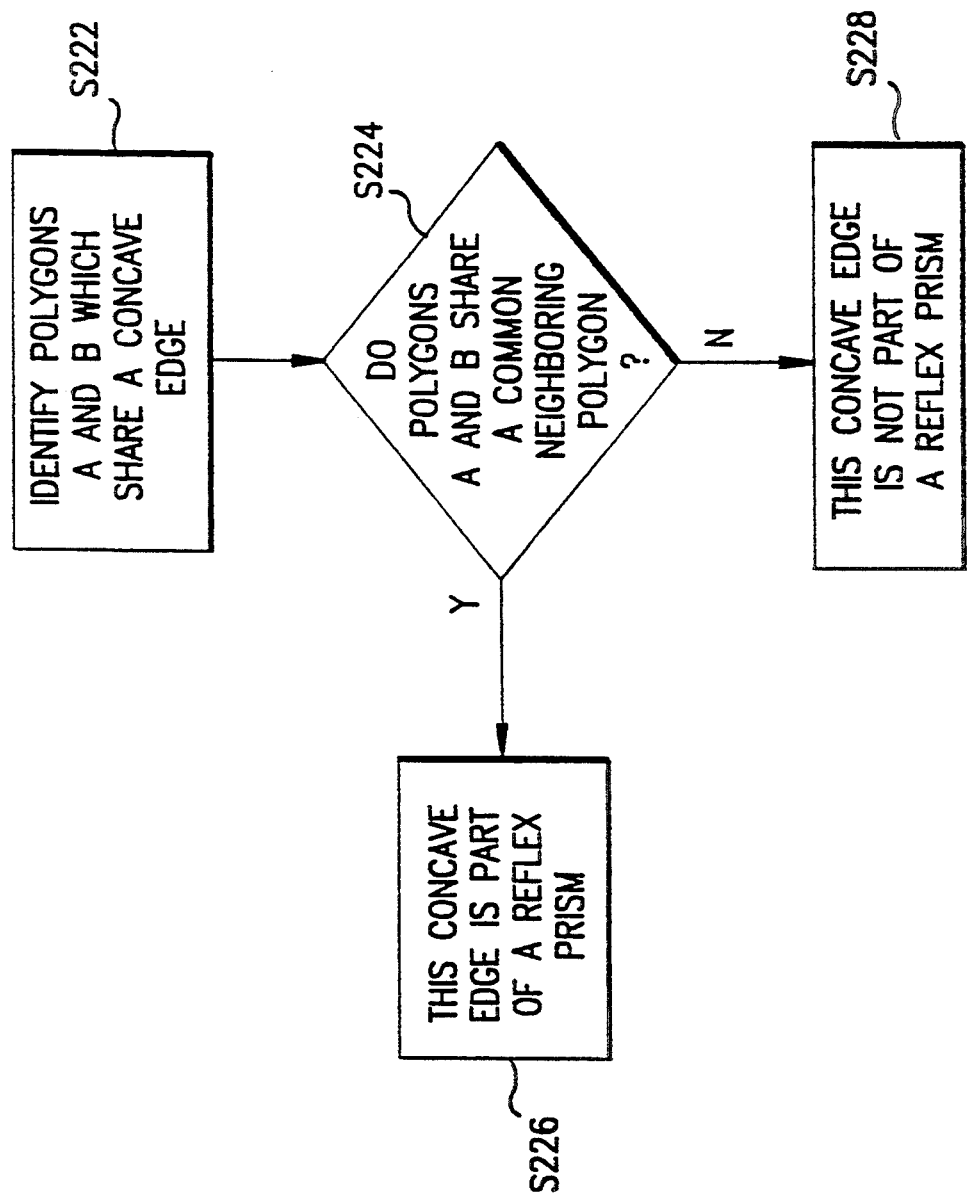

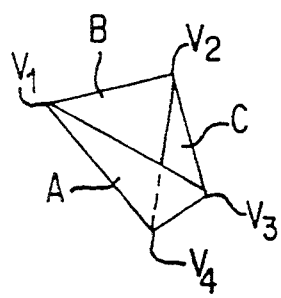
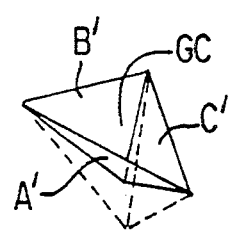
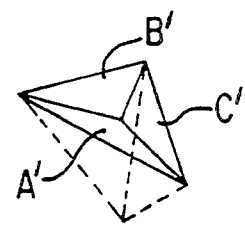
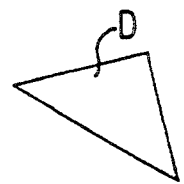
FIG. 22A  FIG. 22B  FIG. 22C  FIG. 22D
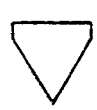
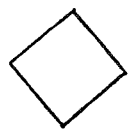
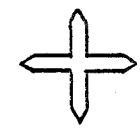
FIG. 29A  FIG. 29B  FIG. 29C  FIG. 29D
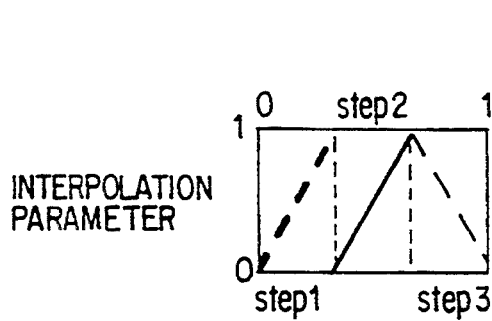
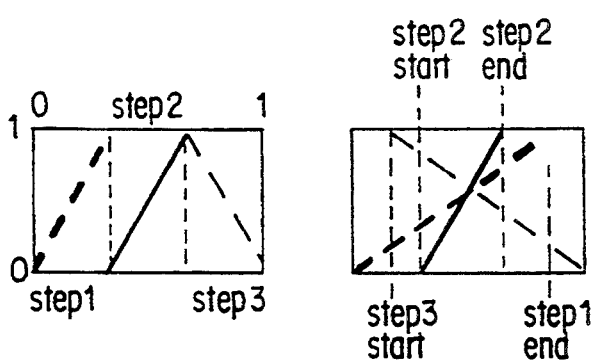
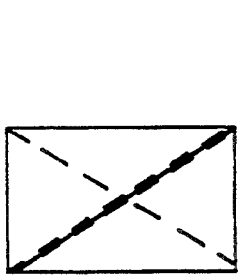
FIG. 31A  FIG. 31B  FIG. 31C

METHODS FOR CONVERTING CONCAVE POLYHEDRA TO THEIR CONVEX HULLS

CROSS-REFERENCE TO RELATED APPLICATION

This application is related to concurrently filed, commonly assigned U.S. patent application Ser. No. 07/813,703, now U.S. Pat. No. 5,317,681 to Andrew Stephen Glassner, and entitled "SEQUENCING AND SCHEDULING MOVES FOR CONVERTING CONCAVE POLYHEDRA TO THEIR CONVEX HULLS", the disclosure of which is incorporated herein by reference.

FIELD OF THE INVENTION

The present invention relates to computer modification of shapes, and in particular to techniques useful in creating a smooth and aesthetically pleasing metamorphosis between two objects.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

With the advent of three-dimensional computer graphics, it has become attractive to many animators and scientists to create computer-generated animation. Such animations are used in the entertainment and advertising industries, for fine art, and increasingly for scientific visualization. The transformation of one shape to another, is generally known as metamorphosis. Traditional two-dimensional and three-dimensional animators have long exploited metamorphosis for its story telling possibilities. The technique of metamorphosis is powerful for conveying symbolic or actual correspondences between apparently different objects. Metamorphosis can also be used in computer aided design, for example, to combine a car body with a tear drop to form a more aerodynamic car body.

A problem with existing metamorphosis techniques is that they can produce unsatisfactory intermediate shapes unless user guidance is provided. However, once shapes become complicated, the amount of user guidance required can become extremely labor intensive.

Thus, it is desirable to provide an automatic process that transforms one shape to another while providing intermediate shapes meeting certain desiderata. For purposes of description, the initial object will be referred to as the "start shape" and the final object the "goal shape". The start and goal shapes together will be called the boundary shapes (or boundaries), and any shape produced along the way will be called a metamorph with respect to its boundaries. Any particular metamorph may be identified by a parameter $\mu$: when $\mu=0$ and $\mu=1$, the metamorph is geometrically identical to the start and goal shapes respectively; intermediate values of $\mu$ generate intermediate (or proper) metamorphs.

It is desirable that the changes between shapes be geometrically, visually, and temporally smooth. Without these constraints one could simply show the start shape for a moment and then abruptly cut to the goal shape. Further criteria may be motivated by considering potential procedures, and deciding what features should be preserved or avoided. To start, consider a procedure which displays the start shape, shrinks it to a point by uniform scaling, and then runs the process in reverse, growing the goal shape from that point to its final form. The procedure is smooth, but degenerate. The nature of the degeneracy may be generalized by considering a complementary procedure, which enlarges the start shape to infinity in all directions, and then shrinks the infinite shape down to the goal shape. The infinite shape can be considered degenerate in the same sense as the point shape: all geometric information about the shape has been lost.

These two procedures demonstrate that one should avoid degeneracy. It is possible that a stronger size condition is desirable: metamorphs should grow no larger or smaller than the sizes of the boundary shapes. One example of a rule motivated by this condition is that the radius of the bounding sphere of each metamorph should always lie in the range defined by the radii of the bounding spheres of the boundary shapes.

Another criterion is illustrated by the following smooth, non-degenerate procedure. Assume for the moment that each boundary shape is made up of a collection of polygons or patches. First shrink each individual patch inwards towards its center, while simultaneously thickening it non-uniformly into a sphere. Once the shape has become a collection of spheres, some are split or joined until the number of spheres is equivalent to the number of patches in the goal shape. The process is then repeated in reverse, flattening each sphere in place until it forms a patch, which eventually all join together to form the goal shape. Like the previous procedure, this technique is not preferable for transforming shapes. The problem here is disconnection. The start and goal shapes are connected surfaces, and it is preferred that the metamorphs be connected in the same way. A stronger statement of this principle is that if the boundary shapes share the same topological genus, then all metamorphs should also be of that genus.

Another problem may be demonstrated by considering the transformation in FIG. 1. It shows two cones CS and CG as the start and goal shapes, respectively, and some metamorphs CM1, CM2, CM3, CM4 created by a possible procedure. In this example the apex of the start cone is moved to the apex of the goal cone, but not all the pieces of the cone move at the same speed. The metamorphs look odd, because they self-intersect, even though neither of the boundary shapes (CS, CG) does. This suggests another principle: If the start and goal shapes do not self-intersect, then neither should the metamorphs.

Thus, a metamorphosis should produce a temporally and geometrically continuous sequence of metamorphs that are non-degenerate, do not self-intersect, and are of constant genus if the boundary shapes are of the same genus.

DISCUSSION OF RELATED ART

When considering existing shape transformation procedures, it is worthwhile to distinguish the three-dimensional problem from the much simpler two-dimensional shape interpolation problem.

The two-dimensional shape interpolation problem may be summarized as finding the transformation of one curve into another. Such curves may be analytic or hand-drawn. The simplest two-dimensional procedure takes piecewise-linear closed curves (polygons) as input. Each vertex in the start shape is matched with a vertex in the goal shape. Metamorphs are created by moving each start vertex towards its corresponding goal vertex. This approach has many problems. As shown in FIG. 2, interpolating a regular pentagon to a regular triangle creates polygons with irregular shapes. Additionally, the determination must be made as to which vertices of the start shape are to be mapped to a common vertex in the goal shape. In FIG. 2, pentagon vertex B is combined with C, and pentagon vertex D is combined with E in order to form the triangle. The mapping in FIG. 2 is not the only possible mapping, but any choice will be many-to-one, and thus cause some sort of degeneracy. The metamorphs can suffer from many problems including self-intersections.

Consider a generalization of this technique which constructs the same number of vertices on both curves, so the mapping is one-to-one. This two-dimensional procedure begins by finding arc-length parameterizations of the two curves, either analytically or numerically. The start curve is then subdivided into some number of equal-sized segments, and the goal curve is similarly subdivided. Then the knots between segments are interpolated from the source to the goal, and the curve reconstructed at each step. The reconstruction may be piecewise linear or smooth. FIG. 3 shows a triangle T converted to a pentagon P by this method. Each edge of the triangle is divided into five segments, the end points of which are moved to form pentagon edges having three segments.

This simple technique usually requires manual assistance to produce pleasing results. FIG. 4A shows the automatic interpolation of two shapes, using a commercially available implementation of this technique using Adobe Illustrator 88, version 1.9.3, Adobe Systems, Inc., Mountain View, Calif., 1988. This transformation is probably unacceptable under most circumstances. The start shape collapses into self-intersecting metamorphs even though neither the start shape nor the goal shape have self-intersections. To control the problems in FIG. 4A, the user is allowed to explicitly place knots at certain places on the two contours, and associate some set of source and goal knots. This provides an easy and intuitive mechanism for the user to force correspondence between specific features in the two contours and eliminate self-intersections. FIG. 4B shows the same contours after an artist has established the correspondence manually.

As with many geometric problems, the two-dimensional solutions described above do not scale well into three-dimensions. Vertex interpolation in three-dimensions is even harder than in two-dimensions. Worse, there is no obvious areal parameterization that enjoys the same monotonicity and simple sorting criterion as scalar arc-length.

Three-dimensional vertex interpolation is a mapping process applicable when source and goal shapes are both polyhedra or other shapes described by control points or vertices. By some means every vertex in the source is identified with a vertex in the goal. To generate metamorphs, each source vertex is moved, usually along a straight path, to the position of its corresponding goal. The difficult problem with vertex interpolation is choosing the vertex correspondences. The two extreme solutions are purely automatic and manual methods. The former has seen some attention by researchers; the latter is widely implemented as a minimal shape interpolation technique by many commercial vendors of animation software.

Vertex matching, whether automatic or user-driven, is faced with a multitude of problems. Automatic vertex interpolation in three-dimensions suffers from the same problems as the two-dimension procedure described above, including self-intersections and degeneracy. Consider a transformation from a cube to a five-sided cone—both objects have six sides. The manner in which the cube's eight vertices map to the cone's six must be determined. Worse, the manner in which the cube's four-sided polygons should be transformed to the cone's pentagonal base must also be determined. Simply put, no form of vertex-mapping—automatic or manual—can effect this transformation. A user may intercede and alter one of the objects, but this is expensive and can be difficult when large models are involved.

In its favor, vertex interpolation allows the user to explicitly control feature matching, as in the two-dimensional case. In the transformation from a bear's head to a mouse's head, the nose can be mapped to the nose, ears to ears, and so forth. This power is not without its price: to create metamorphs that appear like in-between faces, the boundary models must have roughly equivalent connectivity graphs in order for the vertices to be matched. To get good results from vertex matching techniques, the user must plan for interpolation when creating the models (shapes), build models that are topologically similar in key features, and then laboriously identify matched features in the two models. If one wishes to transform between two arbitrary, pre-existing models, matching must be made on an ad-hoc basis, sometimes requiring the manual construction of new vertices to prevent degeneracies during the transformation. Even after all this effort, self-intersections and local degeneracies can easily occur. Although vertex interpolation can produce pleasing transformations when used with care and skill, the amount of manual planning and effort required to achieve good results is prohibitively expensive in most situations.

Automatic vertex matching is an interesting line of development, but it appears very difficult. One simple automatic approach to vertex matching is to find the nets describing the two polyhedra, and then build the product graph of these nets. Conceptually, this net describes a "least common denominator" surface. The size of this combined graph, and thus the combined shape, will be proportional to the product of the sizes of the graphs of the boundary shapes, where size is the sum of vertices, edges, and faces. This explosion of data quickly becomes prohibitive in a production environment where the source and goal shapes may each be built of 10,000 or more polygons.

There are many variations on this approach, but they all come to matching vertices in (possibly expanded) start and goal shapes, which can produce self-intersections and degeneracies.

A more sophisticated automatic system could isolate and classify a wide variety of features, and then find correspondences between features in the two shapes. Techniques for feature extraction and identification are difficult in the far more restrictive two-dimensional domain of image analysis. Presently, there are no three-dimensional tools available to guide such a process. Without a stable, uniform description of local shapes and their classification, automatic feature matching techniques will be ad-hoc collections of heuristics producing unpredictable results when applied to a wide range of shapes.

For these reasons, vertex matching can be considered to represent a brute-force approach. Vertex interpolation requires a prohibitive amount of time and effort from the user when executed manually, and produces unpredictable and undesirable artifacts when carried out automatically.

The other popular method for three-dimensional shape interpolation involves blending implicit functions. The basic idea is to define the surface of the start and goal shapes each as the isosurface of some three-dimensional scalar function. Suppose the start shape is specified by $f(x,y,z)=0$ and the end shape as $g(x,y,z)=0$. Then one easily-generated family of metamorphs $m(\mu)$ may be described as isosurfaces of $m(\mu)=(1-\mu)f+\mu g$. This technique has much to recommend it. There are many techniques available for rendering implicit surfaces, both directly and indirectly. Assuming that one has an implementation of one of these procedures, then creating the metamorphs is trivial. The technique requires no feature matching, and handles any kind of geometry or topology. In fact, the method enjoys the extraordinary ability to gracefully model a change of genus between two boundary shapes. FIG. 5 shows metamorphs generated by this method interpolating a sphere to a torus.

Unfortunately, this technique does not always produce such pleasing sequences of metamorphs. FIG. 6 shows the two-dimensional interpolation of a dumbbell from a straight position to a bent U shape. Note that the balls on the ends of the original dumbbell disconnect from the main shaft and disappear into themselves, while the new ends appear in mid-space and grow, to later connect with the tube. This happens because the metamorphs are simply isosurfaces of the interpolated scalar fields—there is no concept of shape or connectivity built into these representations. The disconnection illustrated in FIG. 6 can grow to unacceptable proportions in even moderately complex scenes. The sense of metamorphosis can be lost in such a transition, as one object twinkles away into many small clouds, and another object twinkles into appearance from scattered dust.

The problem may be tamed somewhat by representing the implicit functions as a collection of keys: $\Sigma(w_i k_i)$, where each $k_i$ represents a different scalar-valued (typically non-linear) vector function. If the boundary shapes are built as a collection of these building-block functions, then one can match keys in the start and goal shapes, and interpolate these keys individually. Although this refinement leads to greater control, there is no guarantee that the interpolated shapes will still not disconnect. More seriously, matching keys is like matching vertices. Therefore, key-matching is undesirable for the same reasons that led to the rejection of vertex interpolation. As with vertex-interpolation, various heuristics may be tried to find the mappings between keys, but these techniques will have the same ad-hoc nature and unpredictable results as those for vertex interpolation.

In "Establishing Correspondences by Topological Merging: A New Approach to 3-D Shape Transformation", by James R. Kent et al, Proceedings of Graphics Interface '91 pp 271-278, topological and geometric data from the two original models is employed in establishing vertex, edge, and face correspondences between the objects. This results in transformations which maintain their connectivity at intermediate steps of the transformation and which display less distortion than those obtained using other procedures. This procedure employs a form of feature-matching which is undesirable for the reasons discussed above. This procedure is also limited to star-shaped polyhedra with no holes, and does not transform concave shapes to their convex hulls.

In "Solid-Interpolating Deformations: Construction and Animation of PIPs" by Anil Kaul et al, EUROGRAPHICS '91, September, 1991, procedures based on Minkowski sum operations are used for determining parameterized interpolating polyhedrons (PIPs). The procedure is limited to transforming one convex polyhedron to another convex polyhedron, and is not extended to concave shapes.

U.S. Pat. No. 4,901,251 to Sfarti describes an apparatus and method for non-ambiguous procedural filling of complex polygons in graphics display memory as defined by an enumeration of P vertices. A co-processor includes means for selecting a first vertex from the enumeration of its P vertices and for decomposing the complex polygon into a set of P-2 triangles. This procedure overcomes several ambiguities associated with polygons that present concave boundaries, possess self-intersecting boundaries, have overlapping sections or contain a fully enclosed hole. This reference is directed to two-dimensional image processing, and does not perform a metamorphosis or convert concave shapes to their convex hulls.

U.S. Pat. No. 4,962,468 to Beauregard et al. describes two procedures that are used when filling polygons on a graphics display. The first procedure tests the polygon for convexity by testing for a consistent turning direction, and for once around in the y direction. The second procedure fills polygons which are concave in the x direction and/or which have crossing lines. This reference is directed to two-dimensional image processing, and does not perform a metamorphosis or convert concave shapes to their convex hulls.

U.S. Pat. No. 4,974,177 to Nishiguchi describes a mapping circuit for texture mapping. A terminal device evaluates corresponding relations between the vertices of a polygon of a three-dimensional graphic and the vertices of a two-dimensional polygon, and it also evaluates the inclinations of the line segments connecting the respective vertices of the polygon of the three-dimensional graphic and the inclinations of the line segments connecting the respective vertices of the two-dimensional polygon. Interpolations are applied and the points obtained are regarded as start points or end points, whereby a picture pattern at the coordinates of the respective points of the two-dimensional polygon is displayed on a CRT. Metamorphosis and convex hull formation techniques are not disclosed.

To summarize, vertex interpolation is a brute-force technique which often suffers from self-intersections and degeneracy. Models must be designed with the particular interpolation sequence in mind, so that like features may be matched. Manual approaches require a user to explicitly match source and goal vertices. Automatic vertex matching appears to require difficult pattern extraction and classification techniques that are not yet available. Implicit surface interpolation is a simple method that under the right circumstances can create very attractive metamorphs, with no restrictions on the geometry or topology of the involved shapes. Unfortunately, it usually suffers from disconnection, and the only proposed solutions are analogies to vertex matching, with the same problems.

OBJECTS AND SUMMARY OF THE INVENTION

It is an object of the present invention to provide a procedure which can be used to convert concave shapes into their convex hulls in a manner which is visually smooth. This procedure can be used as part of a larger procedure for interpolating between two shapes. The two shapes are converted into their corresponding convex hulls using the concave-to-convex conversion procedure of the present invention. Then, another procedure is utilized for interpolating between the two convex hulls. In order to display the interpolation from one shape to another, first the starting shape is converted into its convex hull; then the convex hull of the starting shape is converted to the convex hull of the goal shape; subsequently, the convex hull of the goal shape is converted to the goal shape by running the concave-to-convex procedure for the goal shape in reverse.

The new technique described herein is designed to interpolate two polyhedra without user guidance. The technique is limited to non-self-intersecting triangulated polyhedra of genus O (that is, a single closed surface, topologically a sphere). The first condition may be achieved by conventional "shrink wrapping" of any connected shape with a deformable adaptively sampled sphere. The second condition may be satisfied by application of a standard triangularization procedure.

The concave-to-convex procedure generates a family of polyhedra which form a continuous path from input polyhedron to its convex hull. The family of polyhedra are formed subject to the following constraints: all in polyhedra the family must be triangulated, genus O, free of self-intersections, and non-degenerate in the sense that no element of the family is a single point or an infinite object. The input polyhedron is assumed to be well formed; that is, each edge has exactly two faces, and two faces share exactly one edge. Further, the input polyhedron is assumed to have a consistent vertex ordering to its faces (most graphics packages require this information for other purposes), so that the surface normals, determined by a cross-product of two successive pairs of vertices, always point locally outwards.

A key action for converting a concave shape to its convex hull is referred to as a pop. The pop action (or move) converts a concave edge to a convex edge by replacing the two adjacent triangular faces (or triangles) which share the concave edge with two new triangular faces which share the convex edge. The concave edge is defined between two vertices which are common to the two adjacent triangular faces sharing the concave edge. These two vertices are referred to as the shared vertices. Each triangular face will also have a single vertex not shared by the adjacent triangular face. Thus, for each occurrence of a concave edge, two adjacent triangular faces are identified which in turn are defined by two shared vertices and two unshared vertices (one for each triangular face). The pop action creates two new triangular faces from the same four vertices which defined the original two adjacent triangular faces, except the original unshared vertices are the shared vertices of the new triangular faces and the original shared vertices are the unshared vertices of the new triangular faces. The shared vertices of the two new triangular faces define the new convex edge.

The pop action can be performed in a visually smooth manner by: a) identifying the midpoint of the concave-edge; b) defining four temporary triangles by dividing each of the original two triangles using the concave edge midpoint; c) smoothly moving the four temporary triangles by moving the concave edge midpoint to the midpoint of the convex edge (i.e., the midpoint of the line segment defined between the unshared vertices of the two original triangles); and d) replacing the four temporary triangles with the two new triangles.

The two new triangles and two original triangles together define a tetrahedron. The pop action essentially replaces two original triangles (which define half the planar surfaces of a tetrahedron) with two new triangles (which define the other half of the planar surfaces of the tetrahedron) when the two original triangles share a concave edge.

Another action used to convert a concave shape to its convex hull is referred to as a slide action. When two triangles which define a concave edge also share a common neighboring triangle (forming a reflex prism), one of the two new triangles formed by popping the two triangles will correspond to the common neighboring triangle. This results in the formation of a null volume, or dangling face, which is not visually acceptable. Accordingly, a slide action is used to prevent or eliminate the dangling face.

After popping two of the triangles of a reflex prism, a slide action can be performed so as to smoothly eliminate the dangling face. An alternate type of slide action can be used to convert the three triangles forming a reflex prism to a single triangle so that the dangling face is never formed.

A sequencing technique is used to determine the order in which pops and slides should be performed so as to convert a concave shape to its convex hull with a minimal occurrence of self intersections and topological changes.

The sequencing phase builds a list of actions (called the EXECUTE LIST) containing pops and slides which describe the transformation from concave shape to convex hull. For each vertex, the sequencing procedure: a) identifies concave edges including that vertex; b) determines whether the pop action or the slide action should be applied to that edge; c) determines whether it is geometrically safe to pop or slide that edge; and d) places the appropriate action on the EXECUTE LIST if geometrically safe. Each time an action is placed on the EXECUTE LIST for a vertex, the edges associated with that vertex are re-analyzed to determine whether any new concave edges are created, or previous concave edges are eliminated. This procedure is iterated for each vertex until no concave edges remain.

The geometrical safety tests ensure that as many actions as possible are added to the EXECUTE LIST which do not cause self-intersections or degeneracies in the metamorphs. Once only unsafe actions remain, the geometrical safety tests are made less strict so that actions causing degeneracies, self-intersections or other less desirable visual features are placed in the EXECUTE LIST. By postponing unsafe actions as long as possible, it has been found that the concave edges associated with those unsafe moves often are eliminated, or that portions of the object interfering with a previously unsafe move are moved so as to no longer interfere.

A scheduling technique is disclosed which sets a start time for each action while stressing parallelism. The scheduling procedure runs through the EXECUTE LIST in order, assigning as early a start time as possible to each action. The duration of each action is also determined, so that the start and end times for each action are known. If the concave edge eliminated by an action did not exist at time t=0, the start time for that action is the end time of the action that created the concave edge.

BRIEF DESCRIPTION OF THE DRAWINGS

The invention will be described in detail with reference to the following drawings in which:

FIGS. 11A–11C illustrate a simple polyhedron, a vertex list for that polyhedron, and a face list for that polyhedron, respectively;

FIG. 20 is a flowchart illustrating a procedure for determining whether a concave edge is part of a reflex prism;

FIGS. 22A–22D illustrate a reflex prism being converted to a single polygon by the procedure of FIG. 21;

FIGS. 29A–29D illustrate a two-dimensional metamorphosis of one shape to another according to the present invention;

FIGS. 31A–31C illustrate timing charts for the three steps involved in converting one concave shape to another concave shape.

DETAILED DESCRIPTION OF THE PREFERRED EMBODIMENTS

I. Convex-To-Convex Interpolation:Asynchronous Truncation

This section describes an automatic method for interpolating any two convex polyhedra built of convex facets. However, it is understood that the technique for converting concave shapes to their convex hulls (to be described in later sections) can be used with other convex-to-convex procedures. A number of metamorphosis procedures require convex shapes as their input, and thus the later described concave-to-convex procedure could be used with these other procedures. For example, the presently disclosed concave-to-convex procedure could be used to convert concave shapes into their convex hulls which are then input to the procedure disclosed in the above cited paper by Anil Kaul et al, and to convert the convex output of that procedure into its concave shape.

Figure 1:
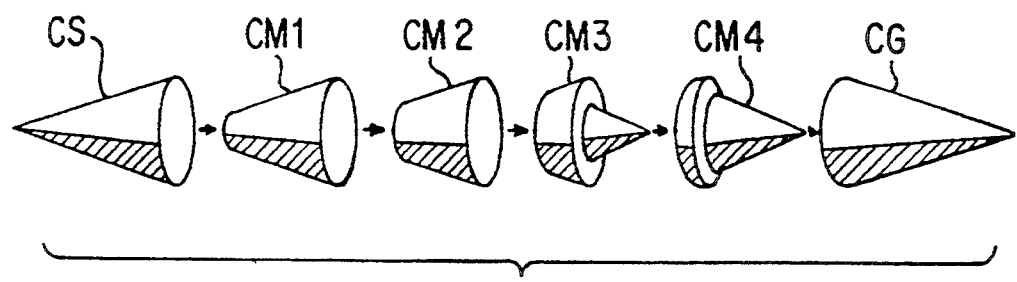
FIG. 1 illustrates the metamorphosis of one cone to another where the intermediate metamorphs self-intersect.
Figure 2:
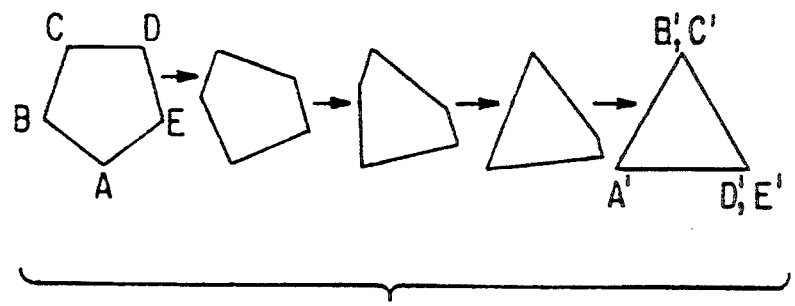
FIG. 2 illustrates the two-dimensional metamorphosis of a pentagon to a triangle using vertex matching.
Figure 3:
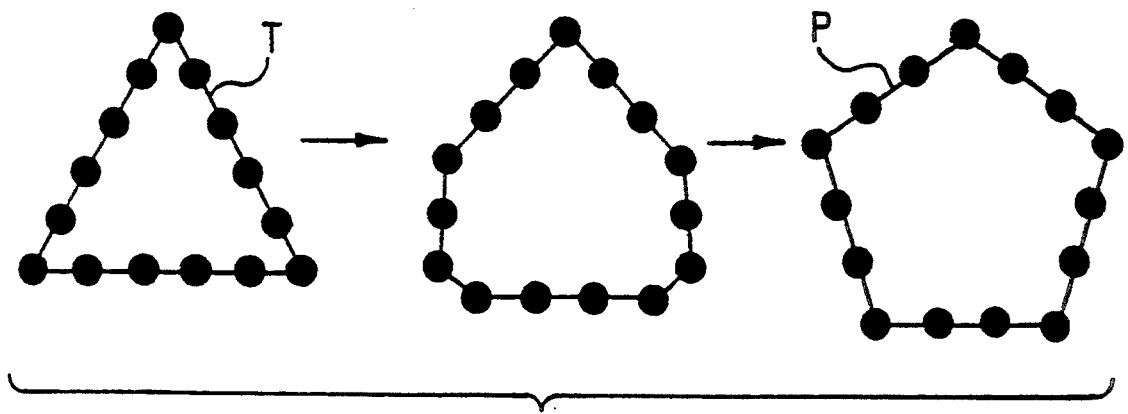
FIG. 3 illustrates the two-dimensional metamorphosis of a triangle to a pentagon using arc-length parameterization.
Figure 4A:
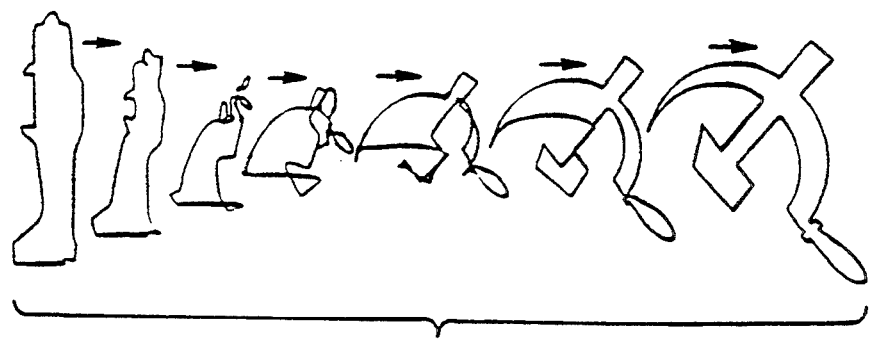
FIG. 4 illustrates a two-dimensional metamorphosis between two complex shapes using a commercially available system that relies upon arc-length parameterization.
FIG. 4B illustrates a two-dimensional metamorphosis of the FIG. 4A shapes using the system of FIG. 4A and user controlled feature matching.
Figure 4B:
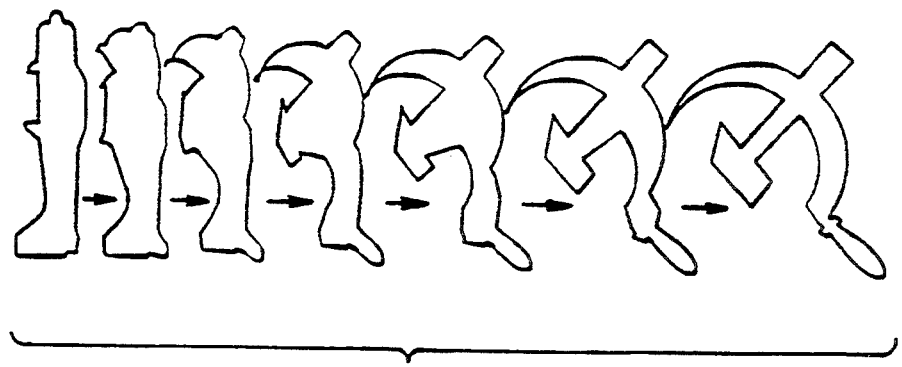
Figure 5:
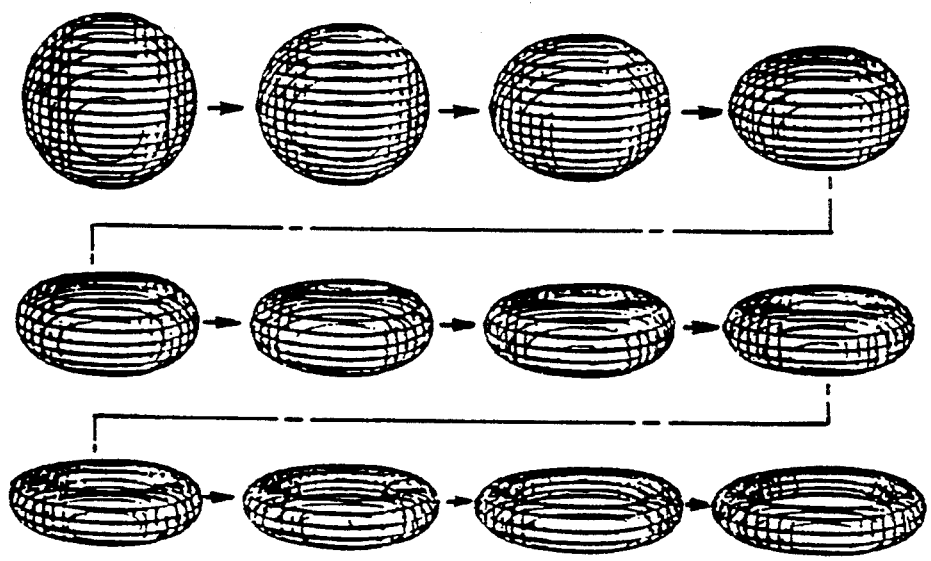
FIG. 5 illustrates a three-dimensional metamorphosis of a sphere to a torus by blending implicit functions.
Figure 6:
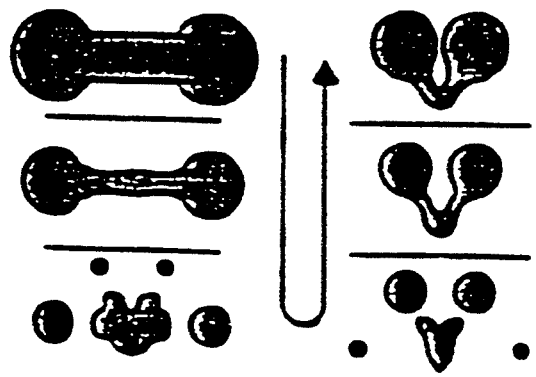
FIG. 6 illustrates a two-dimensional metamorphosis of a straight dumbbell to a curved dumbbell by blending implicit functions, and illustrates degeneracies which occur in the metamorphs.
Figure 7:
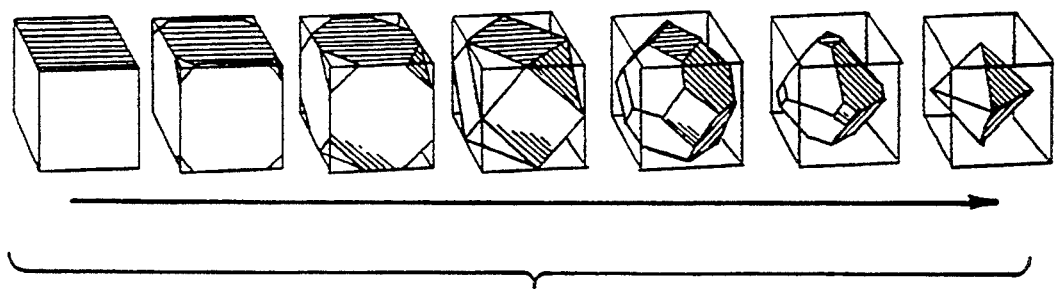
FIG. 7 illustrates a three-dimensional metamorphosis of a cube to an octahedron using the disclosed convex-to-convex procedure.

The disclosed convex-to-convex procedure is simple to implement, and linear in time and space with respect to the number of polygons in the two boundary shapes. The number of vertices and faces in the metamorphs is bounded by the sums of the corresponding measures in the boundary shapes. The procedure produces metamorphs that are temporally continuous, connected, and non-degenerate. The procedure, called asynchronous truncation, is inspired by the classical construction of dual polyhedra (see J. Kappraff, "Connections" McGraw-Hill, Inc , New York, 1991; A. Pugh, "Polyhedra: A Visual Approach" University of California Press, Berkeley, 1976; and R. Williams, "The Geometrical Foundation of Natural Structure", Dover Publications, New York, 1979). For example, a cube may be turned into its dual, the octahedron, by truncating each corner, as shown in FIG. 7. In the final, rightwardmost frames, the outline of the original cube is shown for illustration purposes only, it being understood that the cube has been converted to the octahedron.

The present procedure generalizes this traditional technique by imagining the truncation to be carried out by a set of moving planes, and then de-synchronizing the movement of these planes. The procedure will first be described in two-dimensions for simplicity: the generalization to three-dimensions is trivial.

Figure 8:
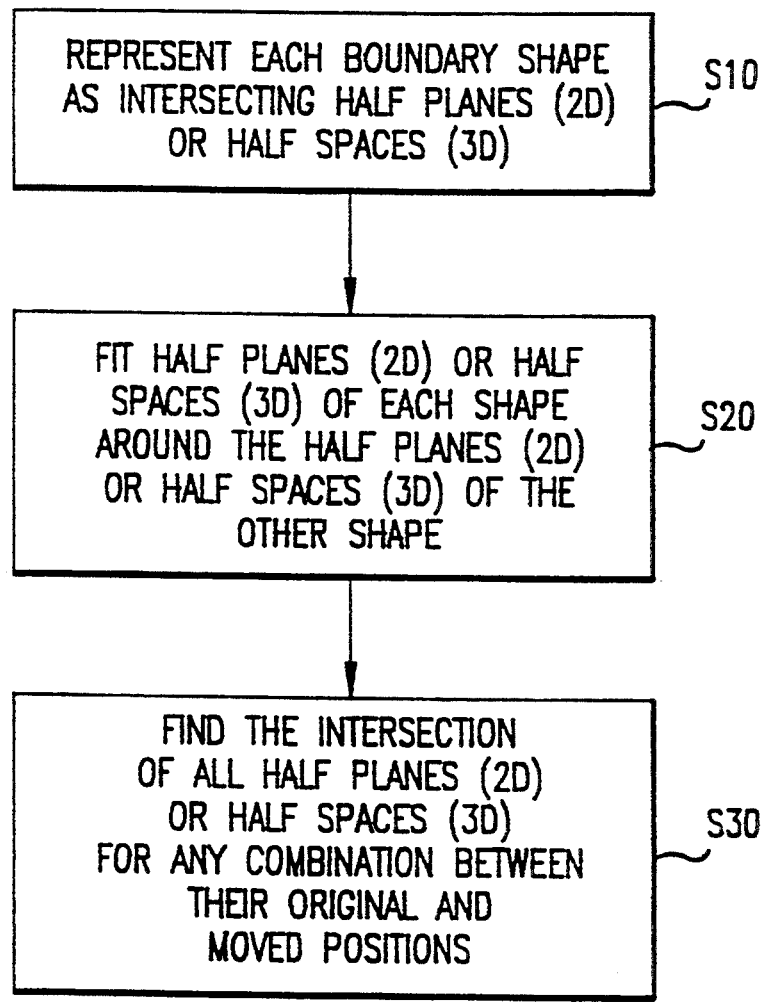
FIG. 8 is a flowchart illustrating a procedure for interpolating between two convex shapes according to the present invention.
Figures 10A, 10B, 10C, 10D, 10E:
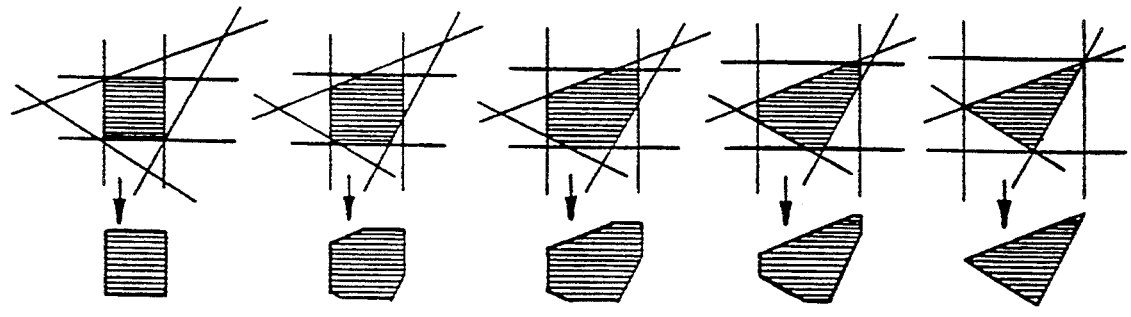
FIGS. 10A–10E illustrate metamorphs at times 0.0, 0.25, 0.50, 0.75 and 1.00 and the intersecting half-planes which form these shapes for the two-dimensional shapes of FIGS. 9A–9H.

As illustrated in FIG. 8, the procedure may be described in three steps: a construction step S10 (hereafter, all steps are referred to with the prefix S), a fitting step S20, and an interpolation step S30. The steps as applied to two boundary shapes are illustrated in FIGS. 9A–H, which show a square SQ (FIG. 9A) turning into a triangle TR (FIG. 9E). For clarity in FIGS. 9A–H, the boundary shapes are not shown overlapping, though in general they may.

Figure 9A:
FIGS. 9A–9H illustrate an application of the convex-to-convex procedure of FIG. 8 to a two-dimensional metamorphosis of a square to a triangle.
Figure 9B:
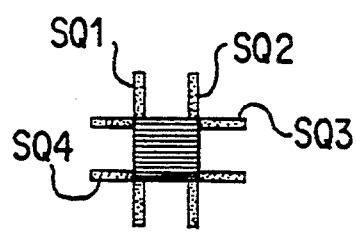
Figure 9C:
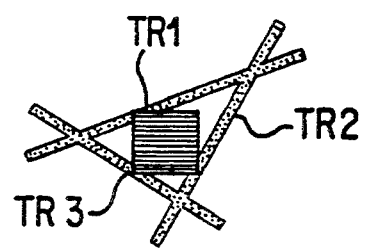
Figure 9D:
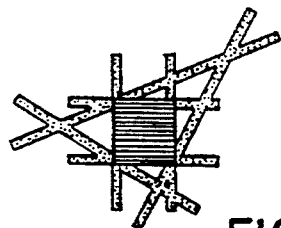
Figure 9E:
Figure 9F:
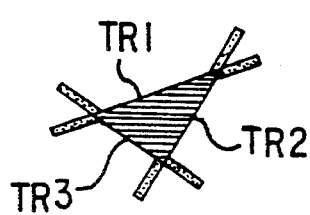

The construction step S10 is shown in FIGS. 9B and 9F. Each boundary shape is represented as the intersection of a set of half-planes (SQ1–SQ4 for square SQ, and TR1–TR3 for triangle TR). Each half-plane is identified by an oriented line. These lines are coincident with the edges of the object, oriented so their normal points inwards (the grey zone on each line in the figures indicates the positive side).

Figure 9G:
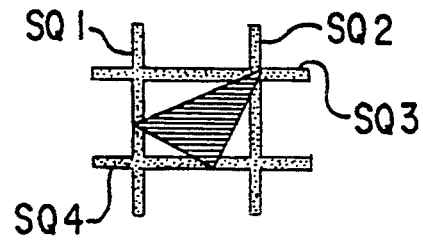

The fitting step S20 involves fitting the half-planes of one boundary shape as tightly as possible around the other boundary shape. In FIG. 9G the four lines SQ1–SQ4 of the start square are shown just embracing the goal triangle TR. Similarly, FIG. 9C shows the three lines TR1–TR3 of the triangle just embracing the square SQ. Notice that neither shape is scaled; rather, each line is moved individually along its own normal. Thus the intersection of the four half-spaces in FIG. 9G forms a rectangle, not a square. The positions of the four lines SQ1–SQ4 in FIG. 9B are called their original locations; the locations of the same four lines in FIG. 9G are called their moved locations. Similarly, the lines TR1–TR3 of the triangle are in their original locations in FIG. 9F, and their moved locations in FIG. 9C. Note that to describe the location of a line, only a single number needs to be specified: its distance from the origin measured along a line through the origin parallel to the line's normal.

Figure 9H:
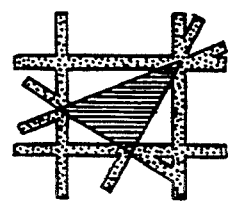

FIG. 9D shows the four half-planes of FIG. 9B and the three half-planes of FIG. 9C superimposed. Note that their intersection is simply the original square SQ in FIG. 9A. Similarly, FIG. 9H shows the planes of FIGS. 9F and 9G superimposed; their intersection is the triangle TR in FIG. 9E. Note also that in each of FIGS. 9D and 9H there are seven planes.

To generate a metamorph (step S30 in FIG. 8), simply move the seven lines from their positions in FIG. 9D toward their positions in FIG. 9H, and find the intersection of the seven half-planes.

FIGS. 10A through 10E show three examples at 0.25 (FIG. 10B), 0.5 (FIG. 10C) and 0.75 (FIG. 10D), of the way. Each figure shows the positioning of lines SQ1–SQ4 and TR1–TR3 as well as the shape which results from their intersection. Note that the shapes deform smoothly, they always have genus O, and they are non-degenerate.

One can visualize the construction of the metamorphs by imagining the boundary shapes on parallel planes in three-dimensions. The paths swept by the moving lines form oblique planes in this space, which together form a three-dimensional shape. Each metamorph represents the intersection of a plane parallel to the original planes with the enclosed solid. This solid is in fact the convex hull of the two shapes in their parallel planes, with cross-sections that are clearly continuous, genus-O, non-degenerate shapes.

The procedure is easily extended to three-dimensions by replacing the lines defining half-planes by planes defining half-spaces. Again the position of each plane may be represented by a single number: representing a plane as a normal N plus offset d, so that points P on the plane satisfy $N \cdot P + d = 0$, only d will change as the plane moves along its normal. Thus, each plane is represented as a normal N (a vector defined by three numbers $N_x$, $N_y$, $N_z$) and a distance (d) from the origin. To visualize the plane, find the point located the distance d from the origin along a normal N. The plane extends perpendicularly outward from the normal at that point. Thus, planes move along their normal by changing the value of d. Although the four-dimensional hypersolid swept by the plane is hard to visualize, analogy with the two-dimensional case ensures that the solids created by the intersection of the swept planes will enjoy the same desirable properties as the two-dimensional shapes.

The interpolation technique may be easily implemented by a single procedure which accepts an input shape and a plane, and performs a Sutherland-Hodgman re-entrant polygon clip on that plane. See I. E. Sutherland and G. W. Hodgman, "Reentrant Polygon Clipping" CACM, 17(1), January 1974, the disclosure of which is incorporated herein by reference. All new vertices generated on the plane may then be stitched together unambiguously into a single convex cap. One may start with a simple shape (such as a cube) guaranteed to enclose both boundary shapes, and then successively slice with each moving plane. Of course, such a slicing routine will only work for convex polyhedra made of convex polygons, but that is exactly the type of shape generated by the intersection of half-spaces. The result is a series of metamorphs with a changing number of vertices, edges, and faces, yet represents a smooth transition from one shape to another.

In essence, each plane for each shape will have a start position and an end position (each position is defined as a different value of d). The movement of each plane between its two end positions can be scaled so that at $t=0$, it is at its start position, and at $t=1$, it is at its end position. Assuming polyhedron A ($P_A$) is to be converted to polyhedron B ($P_B$), at time $t=0$, the planes of each polyhedron are located at a position where their intersection will define $P_A$, and at time $t=1$, the planes are located so that their intersection will define $P_B$. Thus, at $t=0$, the value of d for each normal N in $P_A$ corresponds to the original location of each plane, and the value of d for each normal N in $P_B$ corresponds to the moved location of each plane (see description of FIGS. 9A–9H). As the value of t changes from 0 to 1, each plane of $P_A$ moves toward its moved position, and each plane of $P_B$ moves toward its original position. The intersection of all planes is continuously determined and output (e.g., to a monitor) if desired. The determination and output of plane intersections can be carried out in a conventional manner.

If the shape is textured with a solid texture then the texture on the moving faces is easily determined. Mapped planar textures are also easily accommodated. For each textured plane, build a texture reference plane parallel to the original plane but passing through the origin. The coordinate system of the texture plane is built so that one axis is perpendicular to the plane, and the other two correspond to the U and V directions of the texture on the plane; these may be found from the images of any three non-colinear points on the original plane. The texture coordinates at any point on the moving plane may then be found by the coordinates of the parallel projection of the point to the texture reference plane. Multiple textures are represented by multiple planes. As the planes move, the textures move with them, though of course the mapped textures will not flow smoothly across polygon borders. Thus, metamorphs may be textured consistently from frame to frame, despite the changing numbers of sides and vertices.

II. Concave-to-Convex Interpolation

The procedure presented in the previous section only interpolates convex polyhedra of genus O built of convex facets. This method may be used as the central step for interpolating concave polyhedra if they are transformed to their convex hulls first. Such a concave-to-convex transformation is presented in this section.

There is nothing new about finding the convex hull of a polyhedron. Several good techniques are reviewed in "Computational Geometry: An Introduction" by F. P. Preparata and M. I. Shamos, Springer-Verlag, Heidelberg, 1985, the disclosure of which is incorporated herein by reference. However, none of those techniques produce visually meaningful intermediate results, in the sense that the intermediate shapes meet the same criteria discussed above for metamorphs. Indeed, the concave-to-convex transformation is a metamorphosis itself.

As mentioned above, the technique described below assumes the shape is a genus-O triangular mesh. A shape can be represented as a triangulated polyhedron of genus-O by standard techniques for shrink-wrapping any connected shape with a deformable, adaptively sampled sphere, and by application of a standard triangularization technique (see the above incorporated book by F. P. Preparata et al). The triangulated shape must also be simply connected, that is, every edge has two faces, and all faces around a vertex are connected by edges. Accordingly, the polyhedron input into this procedure can not have holes.

It is also assumed that all surface normals originally point outwards from the local interior of the body. A consistent clockwise or counter-clockwise vertex naming convention allows normals to be unambiguously determined on the fly. For example, a right-hand-rule can be applied when naming the vertices of a triangular face so that normals consistently point locally outward.

Figure 11A:
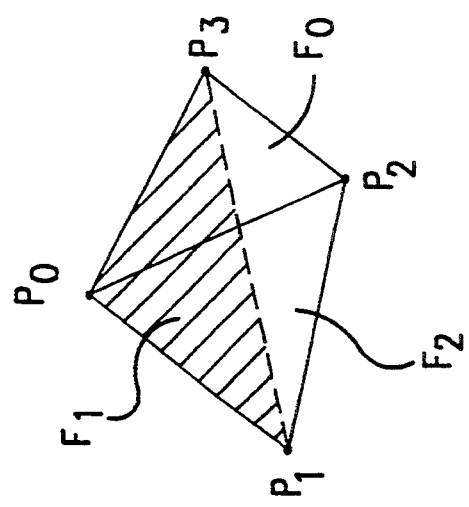

A polyhedron which satisfies the above conditions is input to the concave-to-convex procedure as a list of vertices $P_i(x,y,z)$ and a list of faces $F_i$, each face defined by three vertices. As stated above, a consistent vertex naming convention is employed so that the face normals always point away from the inside of the polyhedron. FIGS. 11A–C illustrate a polyhedron having three faces $F_0,F_1,F_2$, defined by four vertices $P_0,P_1,P_2,P_3$, and the vertex and face lists for the polyhedron. The shaded face, $F_1$, is hidden from view in FIG. 11A. The bottom triangle (defined by vertices $P_1,P_2$ and $P_3$) is open, and thus does not define a face.

The new procedure creates genus-O, non-degenerate metamorphs. It attempts to avoid self-intersecting shapes and usually succeeds, though they may still appear. The procedure produces a data structure which is used to produce a shape anywhere between the original concave shape and its convex hull. This data structure is built in two phases: a sequencing phase and a scheduling phase. The goal of the procedure is to construct a timed series of actions, which directs the construction of interpolated shapes. The sequencing phase consists of determining the next action to be executed, performing that action, and then determining the next action. The scheduling phase takes this list of actions and attaches timing information to each one, parallelizing actions when possible.

Two types of actions used by the procedure will be described below. The sequencing and scheduling of these actions will then be described.

IIA. Actions: Pops and Slides

Figure 12A:
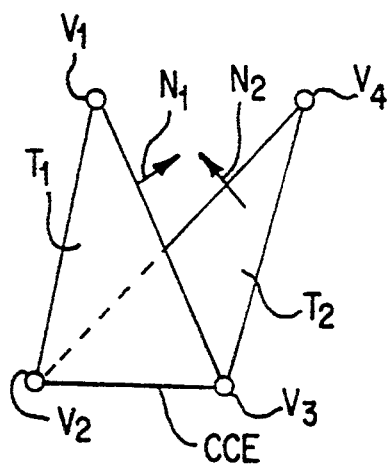
FIG. 12A illustrates two triangular faces forming a concave edge.
Figure 12B:
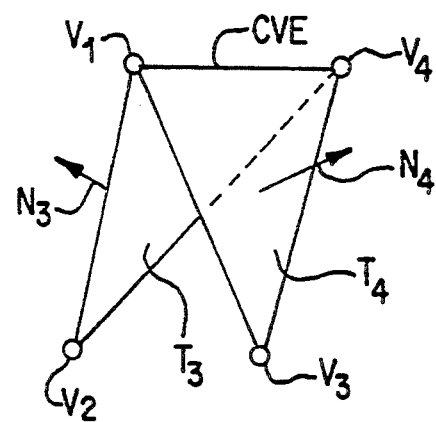
FIG. 12B illustrates two triangular faces and a convex edge that are produced after the FIG. 12A concave edge is popped.

The basic action in the concave-to-convex interpolation method is the pop. A pop comprises replacing one pair of triangles that share a concave edge (also referred to as a reflex edge) with the complementary pair, removing the concave edge and inserting a new convex edge. FIGS. 12A and 12B illustrate a pair of triangles before and after popping, respectively. Note that the same four vertices, $V_1,V_2,V_3$ and $V_4$ are used both before and after. Since the purpose of the pop is to remove a reflex edge (a concave edge) from the model, reference is usually made to popping an edge, though sometimes it is useful to speak of popping a pair of polygons.

In FIG. 12A and 12B, it is assumed that the main body of the object lies below these figures. Thus, with reference to FIG. 12A, the faces formed by triangles $T_1$ ($V_1, V_3, V_2$) and $T_2$ ($V_4, V_2, V_3$) share a common concave edge CCE defined by vertices $V_2$ and $V_3$. As stated earlier, the normals $N_1$ and $N_2$ of triangles $T_1$ and $T_2$ respectively, are defined so that they point away from the inside of the object. As illustrated in FIG. 12B, after triangles $T_1$ and $T_2$ are popped, two new triangles $T_3$ ($V_1, V_4, V_2$) and $T_4$ ($V_4, V_1, V_3$) are formed. Triangles $T_3$ and $T_4$ share a common convex edge CVE defined by vertices $V_1$ and $V_4$. Note that the normals $N_3$ and $N_4$ of triangles $T_3$ and $T_4$ respectively also point away from the inside of the object.

Figure 13:
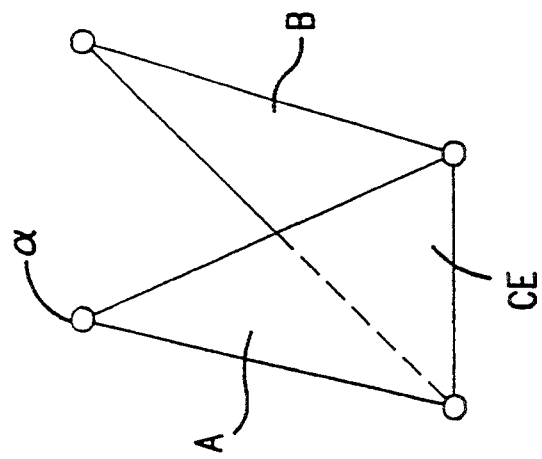
FIG. 13 illustrates two polygons forming a concave edge, and a vertex not shared by both polygons which is used to determine whether the two polygons form a concave edge.
Figure 14:
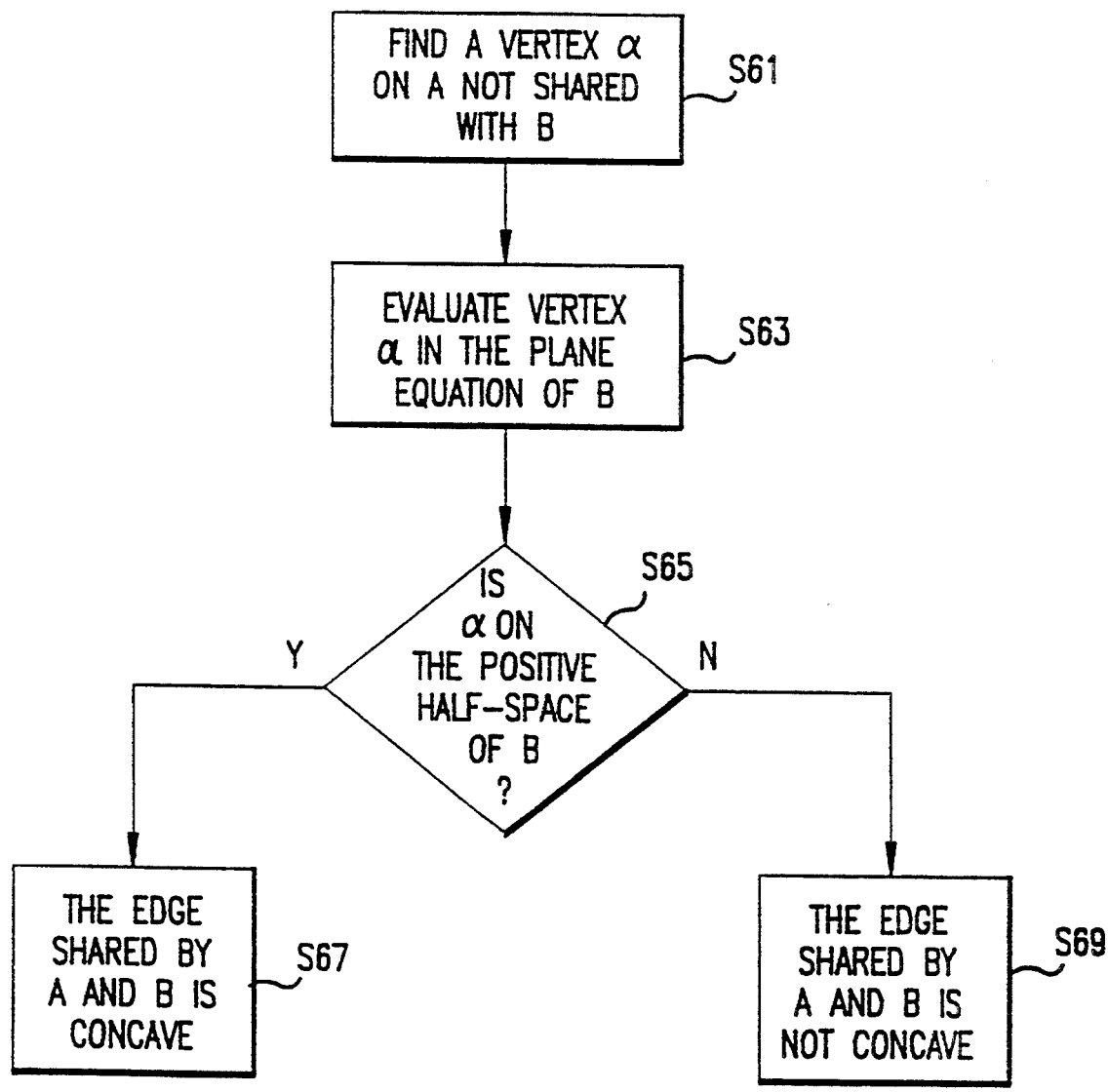
FIG. 14 is a flowchart illustrating a procedure for determining whether an edge shared by two polygons is concave.

A procedure for determining whether an edge is concave will be described with reference to FIGS. 13 and 14. Suppose a common edge CE is bordered by polygons A and B. Find a vertex $\alpha$ on A not shared by B (S61). Then evaluate this vertex in the plane equation for B (S63) and examine the sign of the result (S65). If the vertex is on the positive half-space of B, the shared edge is concave (S67) and it is a candidate for popping. Otherwise, the edge is not concave (S69).

When an edge is concave, it should be popped. The pop procedure will now be described with reference to FIGS. 15, 16 and 17A-F.

Figure 15:
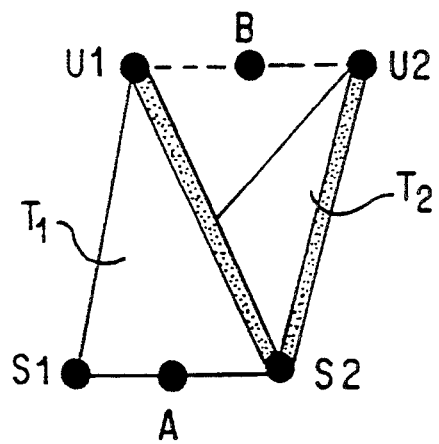
FIG. 15 illustrates two polygons forming a concave edge, wherein a midpoint between their shared vertices and a midpoint between their unshared vertices are labelled.
Figure 17A:
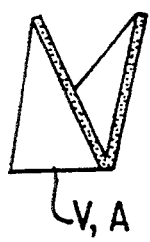
FIGS. 17A–17F illustrate the polygons and concave edge of FIG. 15 being popped according to the procedure of FIG. 16.
Figure 17B:
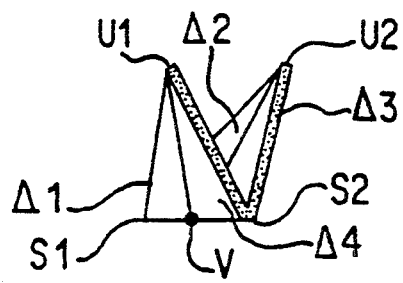
Figure 17C:
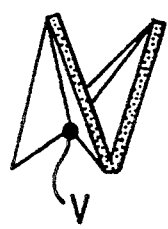
Figure 17D:
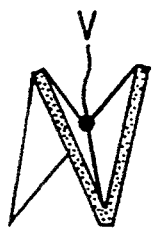
Figure 17E:
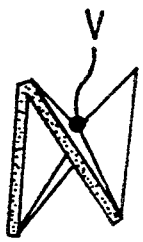
Figure 17F:
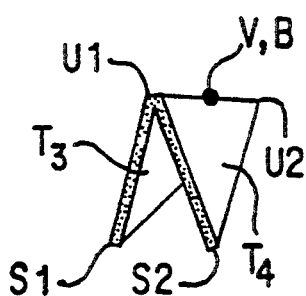

To pop an edge, identify the two shared vertices $S_1$ and $S_2$, and the two unshared vertices, $U_1$ and $U_2$, for two neighboring triangles $T_1$ ($U_1$, $S_1$, $S_2$) and $T_2$ ($U_2$, $S_2$, $S_1$) as shown in FIG. 15. Note that a left-handed-rule is utilized for determining normals in this example. Mark the midpoint of $S_1$ and $S_2$ as A (S621) and the midpoint of $U_1$ and $U_2$ as B. Create a temporary new vertex V, originally at A. Now remove the original two triangles $T_1$ and $T_2$ and replace them with four temporary new triangles (S623): $\Delta 1(U_1 S_1 V)$, $\Delta 2(S_1 U_2 V)$, $\Delta 3(U_2 S_2 V)$, $\Delta 4(S_2 U_1 V)$ as in FIG. 17B (one must take care with the bookkeeping to make sure that the new polygons are built so that the normals face locally outward). Next, in S625, move V from the location of midpoint A toward the location of midpoint B. As the position of V is swept from A to B (as in FIGS. 17B-17F and S627), the original pair of polygons is popped to the new pair. When V reaches B, remove the four temporary triangles and temporary vertex V, and construct new triangles $T_3(U_1 S_1 U_2)$ and $T_4(U_2 S_2 U_1)$ as illustrated in S629. This concludes the pop step. In later sections, references to the "moving vertex" of pop actions will refer to V.

A few characteristics of the pop are worth noting. First, the number of vertices, edges, and faces is the same both before and after a pop—thus the genus remains unchanged. Second, the new triangles exactly fill the hole left by the old ones, so the surface remains connected and non-degenerate. Third, a concave edge ($S_1 S_2$) is replaced by a convex edge ($U_1 U_2$). Consider that each pop effectively fills in a concave hole with a tetrahedron, which is entirely convex. Since the new faces are two faces of the tetrahedron, the result is also guaranteed convex. Fourth, the pop may be animated smoothly from its starting pair of triangles to its replacement pair (FIGS. 17B-17F). The original and final substitutions will be unnoticed since each pair of temporary triangles is coplanar with the single triangle it replaces.

After an edge is popped, the elimination of the original two triangles and creation of the two new triangles may create new concave edges in the overall object. These new concave edges are merely identified and popped in due course. Each popped edge moves monotonically closer to the convex hull. Thus, by repeatedly popping concave edges, checking for new concave edges, and popping the new concave edges, the convex hull will eventually be obtained. The procedure never falls into a cycle or a state moving away from the convex hull. The sequencing procedure for converting an entire object to its convex hull will be described below.

Termination of the process into the convex hull may be demonstrated by noting that no new edges are introduced, and at each step a concave edge is moved closer to the convex hull. Since an edge stops moving upon reaching the hull, after enough pops all edges will be both at the hull and convex, and the process terminates.

One side-effect of a pop is that upon completion it sometimes creates a polygon (triangle) coincident with an existing polygon (triangle). FIGS. 18A-F show an example where a pop causes a new polygon to be built, identical to an existing polygon except for direction of its normal.

Figure 18A:
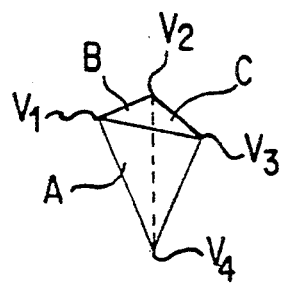
FIGS. 18A and 18B are perspective and plan views, respectively, of a reflex prism.
Figure 18B:
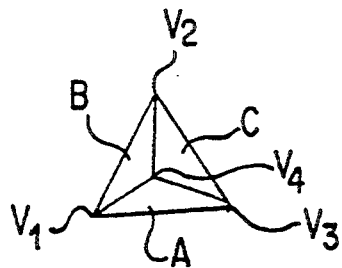
Figure 18C:
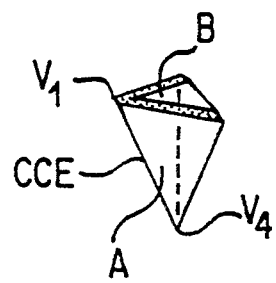
FIG. 18C illustrates two polygons and a concave edge of a reflex prism prior to popping.
Figure 18D:
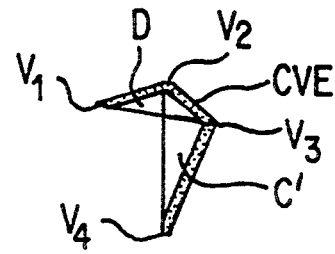
FIG. 18D illustrates the reflex prism of FIG. 18C after popping.
Figure 18E:
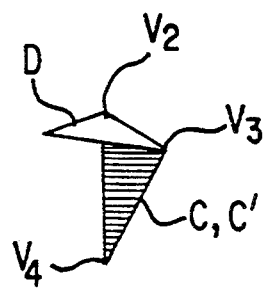
FIG. 18E shows a dangling face formed by popping a concave edge of a reflex prism.
Figure 18F:
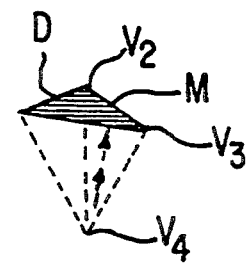
FIG. 18F shows the polygon which remains after a reflex prism is popped, and the dangling face is removed using a first type of slide action.
Figure 19A:
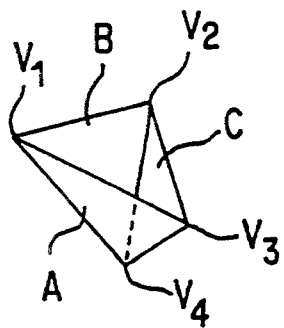
FIGS. 19A–19D illustrate a second type of slide action which is performed directly on a reflex prism without first popping any concave edges of the reflex prism.
Figure 19B:
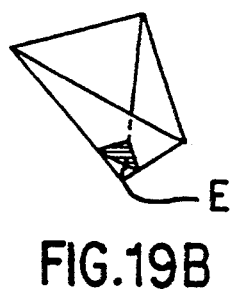
Figure 19C:
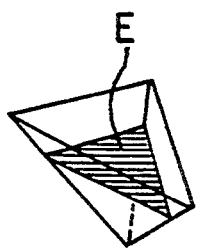
Figure 19D:
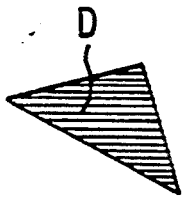

Specifically, FIGS. 18A and 18B are perspective and top views, respectively of three triangles A, B and C forming concave edges (as with earlier examples, the remainder of the shape is assumed to be located below the figures). Using a right-handed-rule to define normals, triangle A is the face defined by ($V_1$, $V_3$, $V_4$), triangle B is the face defined by ($V_2$, $V_1$, $V_4$) and triangle C is the face defined by ($V_3$,$V_2$,$V_4$). Suppose the concave edge CCE defined by vertices $V_1$ and $V_4$ was selected to be popped as illustrated by FIGS. 18C-18D. The resulting triangles C' and D (see FIG. 18D), defined by vertices ($V_3$,$V_4$,$V_2$) and ($V_2$,$V_1$,$V_3$) respectively, would be created by the pop procedure, with edge CVE ($V_2$,$V_3$) being convex. However, new triangle C' corresponds to original triangle C, except for the direction of its normal.

There is exactly one situation in which this triangle duplicating event can occur. When two triangles to be popped share a common neighbor (forming a reflex prism). That is, with reference to FIGS. 18A-F, triangles A and B (the triangles to be popped) share a common neighboring triangle-Triangle C. The result of popping two triangles of a reflex prism is actually a null volume: during the pop, a three-sided pyramid has collapsed into a two-sided pyramid. There is no abrupt visual change at this point, since the transformation is smooth, but the null volume appears visually as a dangling face. That is, keeping in mind the prerequisites of the entire polyhedron (genus-O, simply-connected, etc.) of which the reflex prism is only a small part, additional triangular faces will radiate from edges ($V_1$,$V_2$), ($V_2$,$V_3$) and ($V_3$,$V_1$). Thus, after popping, new triangle D will close the opening which previously existed between these vertices. However new triangle C' (and original triangle C) will extend inside the object (thus the terminology "dangling face" is used to describe these triangles).

The triangles forming the dangling face must be removed (or prevented from occurring) since they will be visible if the object is transparent, and because they will inhibit future moves for surrounding triangles. Repopping the two new triangles (C' and D) will not work since this merely re-creates the original two triangles (A and B). While the newly created face (triangle D) is desirable, the other new triangle C' as well as triangle C should be removed. (Triangles C and C' define the same face, their normals merely point in opposite directions.) The dangling face is removed (or prevented from occurring) with a special action, generically referred to as a slide action.

Null volumes may be detected by analyzing the neighborhood of a pop before it executes (i.e., detecting reflex prisms), or afterwards by searching the vertex lists of pre-existing polygons (which would include triangle C) for a match with the vertex list of a new polygon (which includes triangle C'). Either way, if a null volume is detected, the two participating polygons (triangles A and B), their three edges ($V_1$,$V_4$), ($V_2$,$V_4$), ($V_3$,$V_4$) and the dangling vertex ($V_4$) are all removed from the model (shape) description. Again, the genus is preserved, since the Euler characteristic is unchanged: $V-E+F=(V-1)-(E-3)+(F-2)$. The polygons and vertex making up the null volume are saved in a special list awaiting a slide action, which provides a smooth visual effect matching the deletion of the null polygons.

There are three variations of the slide action. In the first, the pop is performed to create the dangling face (including dangling vertex $V_4$; see FIG. 18E). The dangling vertex is then smoothly moved to the midpoint M of the edge formed by the other two vertices (V₂,V₃), so that the triangle degenerates into a line and disappears.

The second and third types of slide actions do not require the pop action to be performed, and therefore are preferred to, and faster than, the first type of slide action. Each of these actions detects the condition required to produce a null volume (i.e., the existence of a reflex prism), and substitutes a different action for the pop action.

FIGS. 19A–D, illustrate this second type of slide action. In the second type of slide action, a reflex prism is eliminated by generating a single polygon (triangle E) at the dangling vertex ($V_4$) which is parallel to the final polygon (triangle D), and then smoothly sliding this polygon up the three edges of the reflex prism which are to be removed ($V_4,V_1$),($V_4,V_2$),($V_4,V_3$) until this triangle (E) reaches the location of new triangle D.

Figure 21:
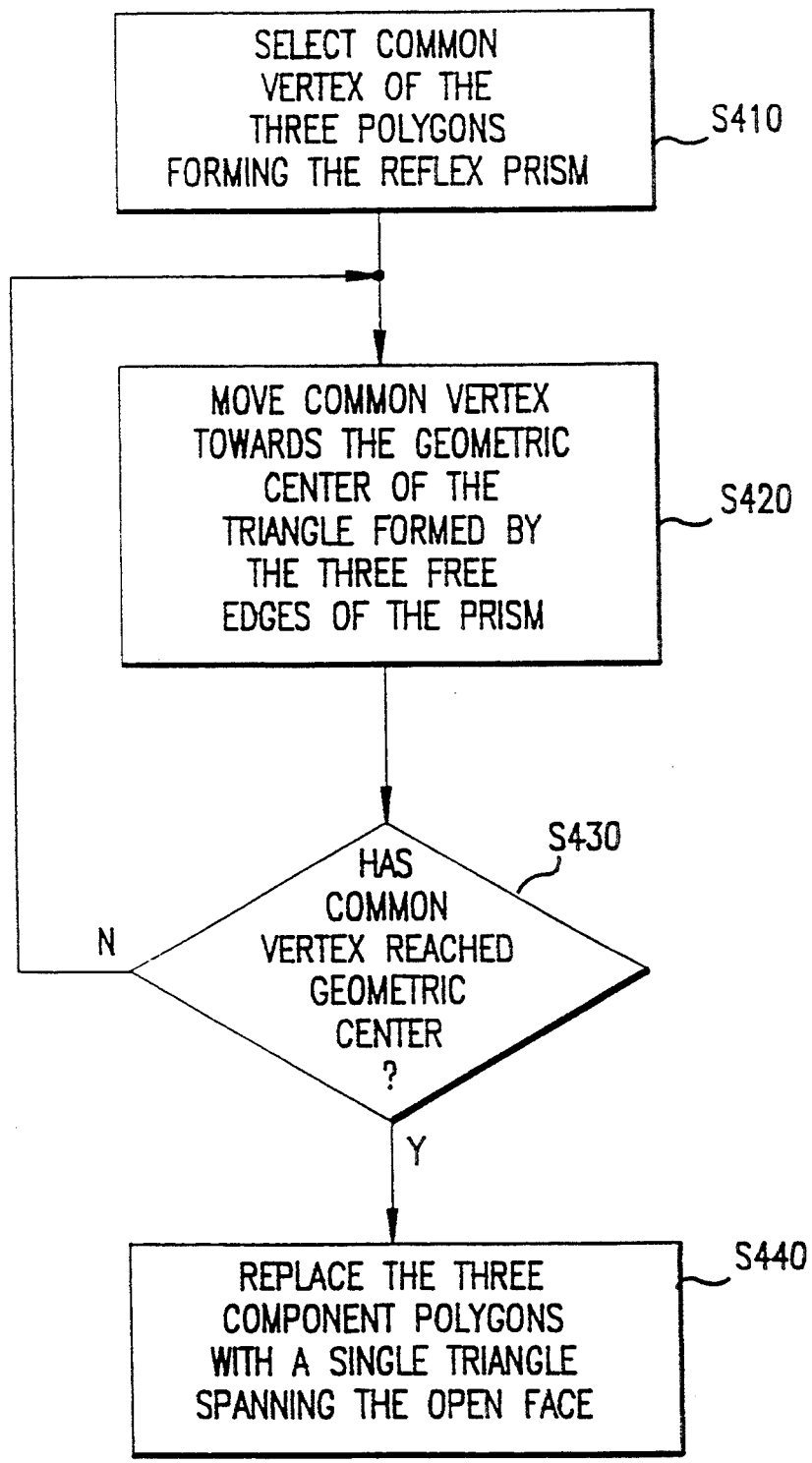
FIG. 21 is a flowchart illustrating a procedure for performing a third type of slide action on a reflex prism, this third type of slide action also being performed without popping any concave edges in the reflex prism.

The third type of slide action is the most preferred since it is the most computationally simple, and most visually pleasing. The procedure for performing the third type of slide action is illustrated in FIG. 21. The appearance of the triangles during the third type of slide action is illustrated in FIGS. 22A–D.

First, a determination is made as to whether two triangles are part of a reflex prism as shown in the flowchart of FIG. 20. Two polygons (e.g., triangles A and B) which share a concave edge are identified. This can be done with the procedure shown in the FIG. 14 flowchart. Next a determination is made as to whether these two polygons share a common neighbor in S224. This can be done by determining whether an edge exists between the unshared vertices ($V_2,V_3$) of polygons A and B. If polygons A and B share a common neighboring polygon, the concave edge between polygons A and B ($V_1,V_4$) is determined to be part of a reflex prism in S226. Otherwise the concave edge is determined to not be part of a reflex prism in S228.

If a reflex prism is found, then it is also known that the common neighbor (polygon C) is part of the reflex prism along with polygons A and B.

To perform the third type of slide action, select the common vertex ($V_4$) of the three polygons forming the reflex prism (S410). Next, move the common vertex ($V_4$) towards the geometrical center (GC) of the triangle formed by the three free edges ($V_1$, $V_2$), ($V_2$, $V_3$), ($V_3$, $V_1$) of the reflex prism (S420). By determining whether common vertex $V_4$ has reached geometrical center GC (S430), S420 is repeated until GC is reached. The result of this procedure is the replacement of triangular faces A, B, C with three temporary faces A', B' C', which move toward the convex hull (see FIGS. 22B–C). Once vertex $V_4$ reaches GC, the three temporary polygons A', B', C' are replaced with a single triangular face D (S440: FIG. 22D).

II.B. Sequencing

The sequencing phase is responsible for constructing the list of actions (pops and slides) which describe the transformation from concave shape to convex hull. There are many possible sequences of actions which will achieve this goal. Different sequencing procedures generate transformations with different looks. The overall technique of sequencing actions is really quite simple, though the implementation requires attention to detail. It is important that the integrity of the objects's connectivity be maintained throughout the process, so concave edges may be accurately detected. Note that since the complete procedure only involves determining and executing a sequence of pops and slides, the entire transformation from concave shape to convex hull enjoys all the properties discussed above for visually pleasing interpolated shapes.

Figure 23A:
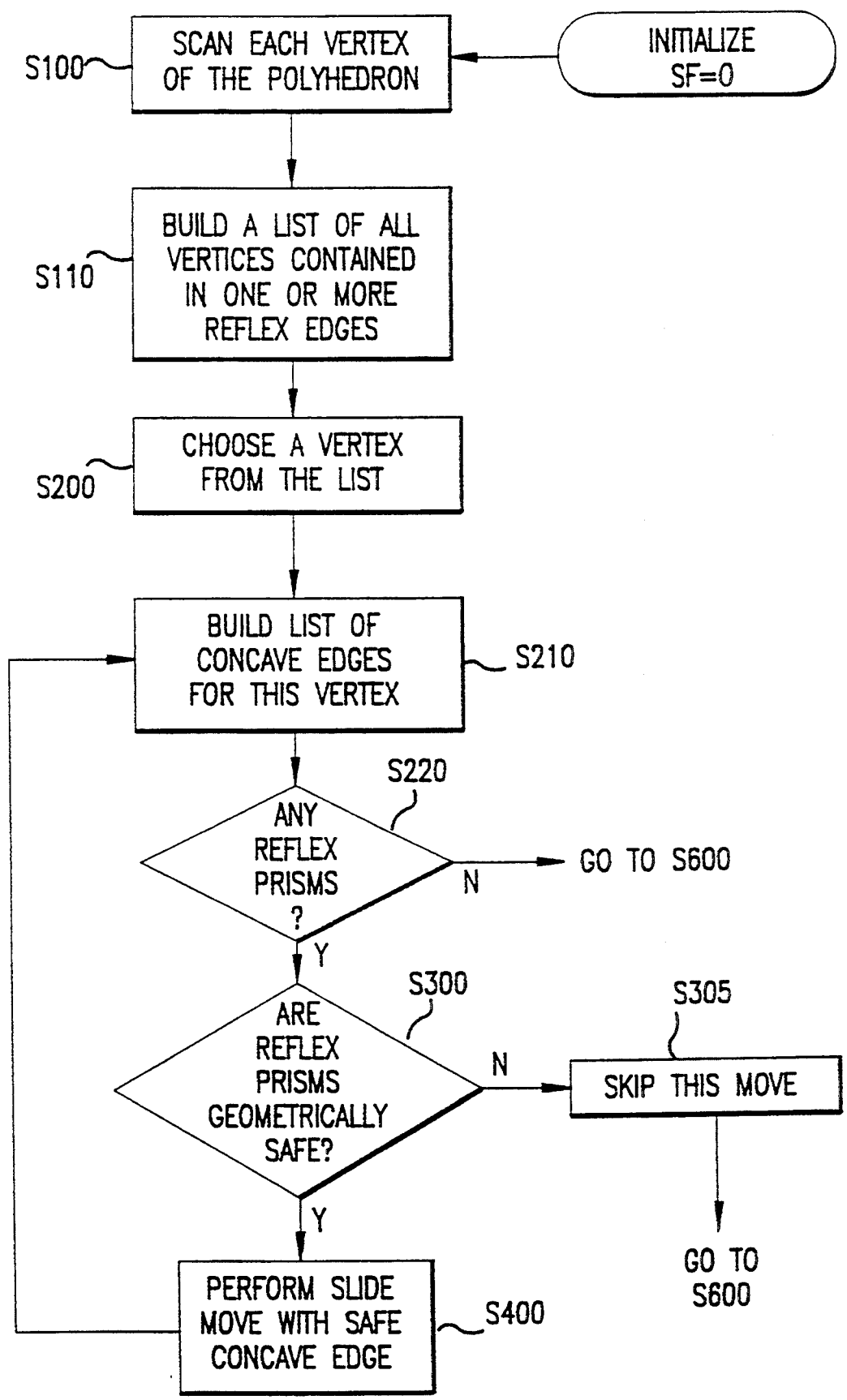
FIGS. 23A–23C are a flowchart illustrating a sequencing procedure for producing an EXECUTE LIST for converting a concave shape to its convex hull using pop and slide actions.
Figure 23B:
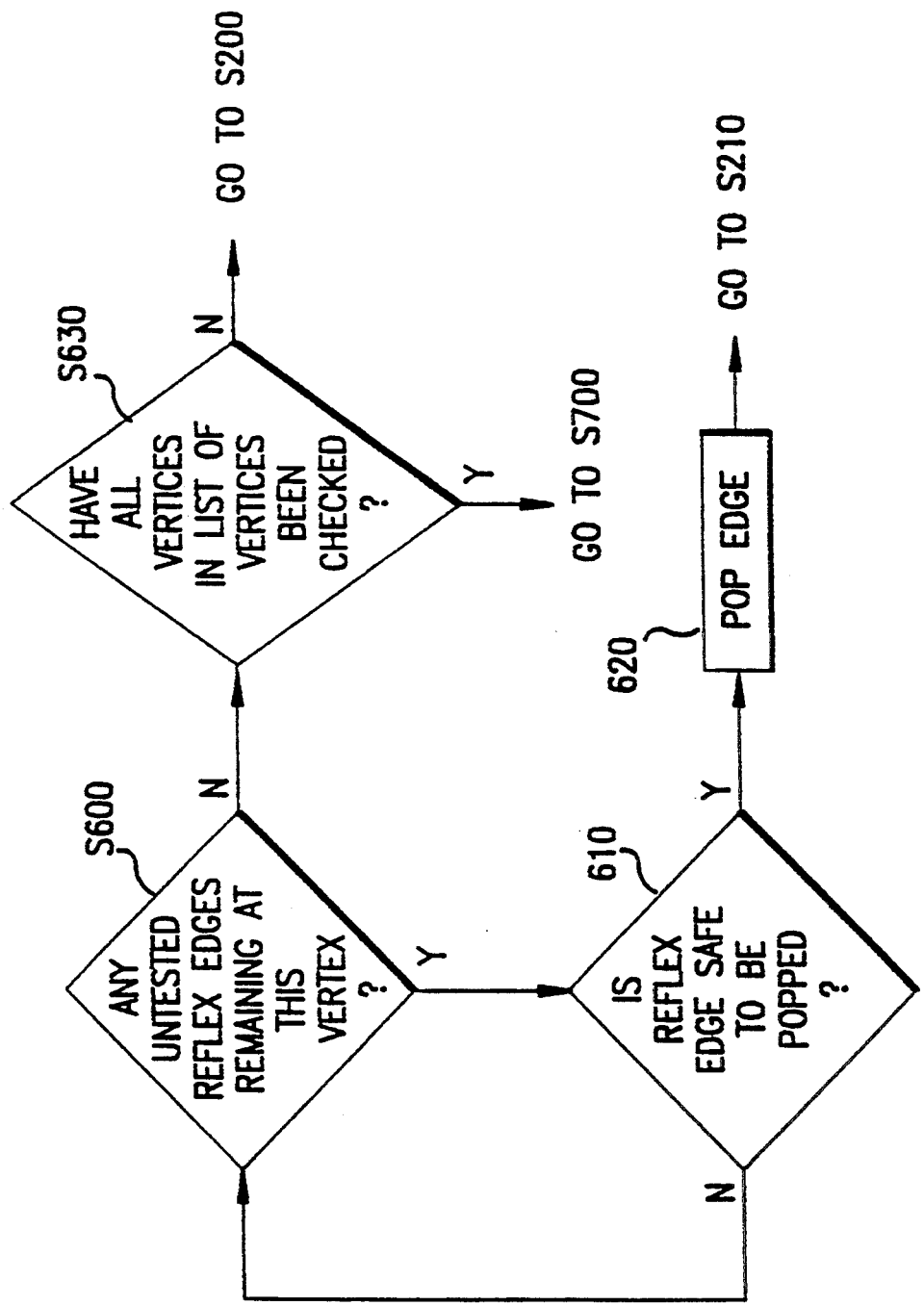
Figure 23C:
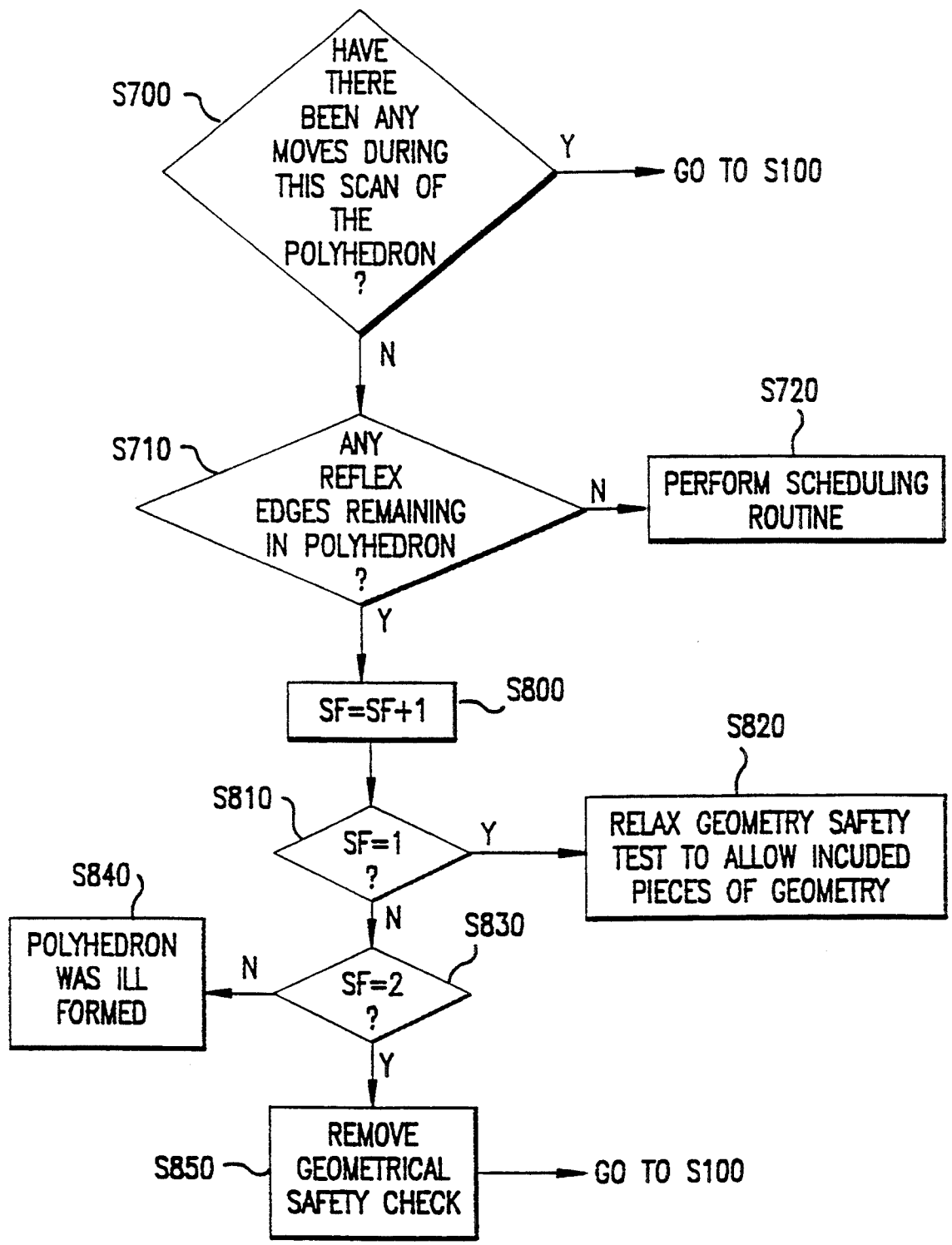
Figure 27:
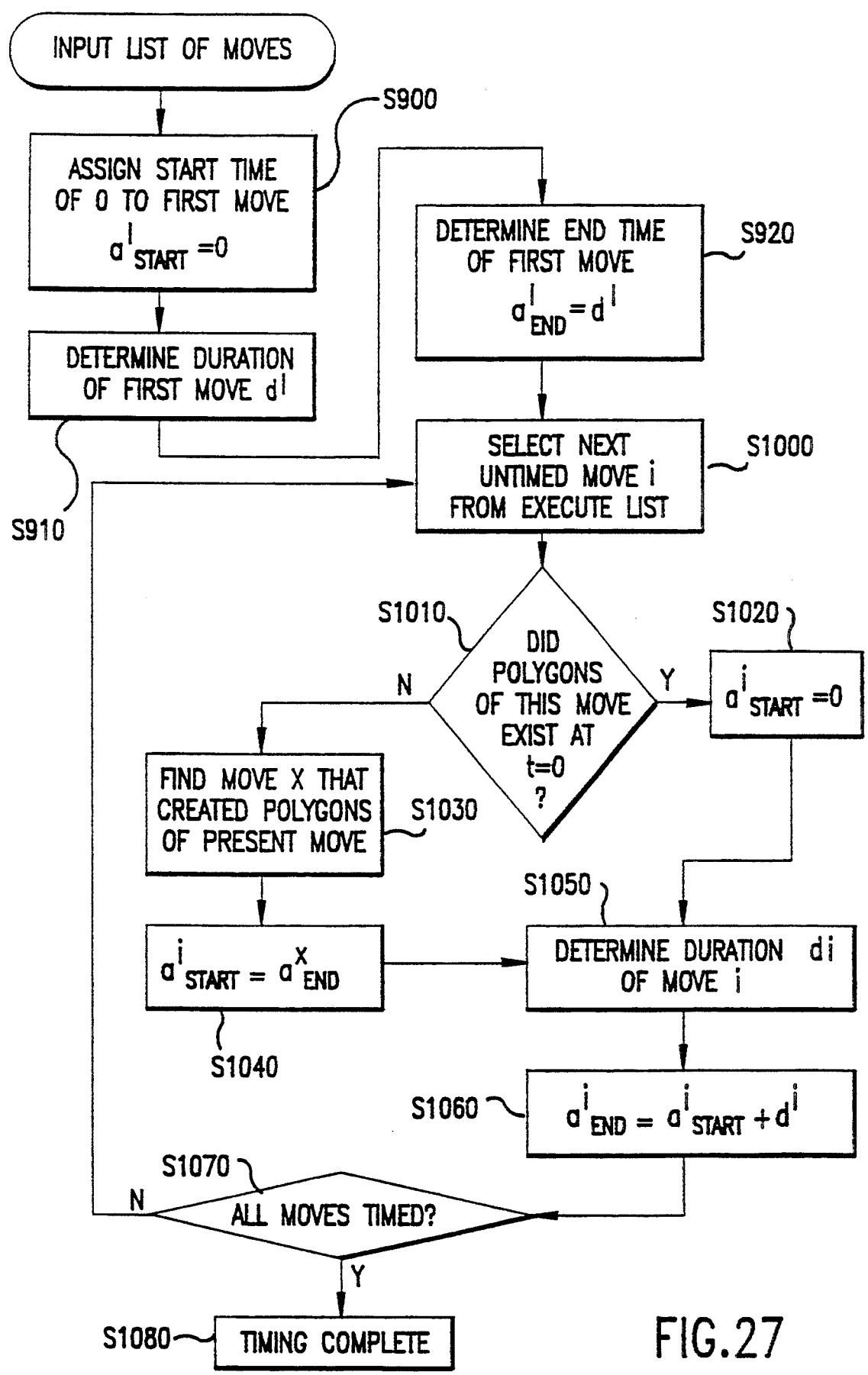
FIG. 27 is a flowchart illustrating a scheduling procedure for determining start and end times for actions contained on an EXECUTE LIST.
Figure 28:
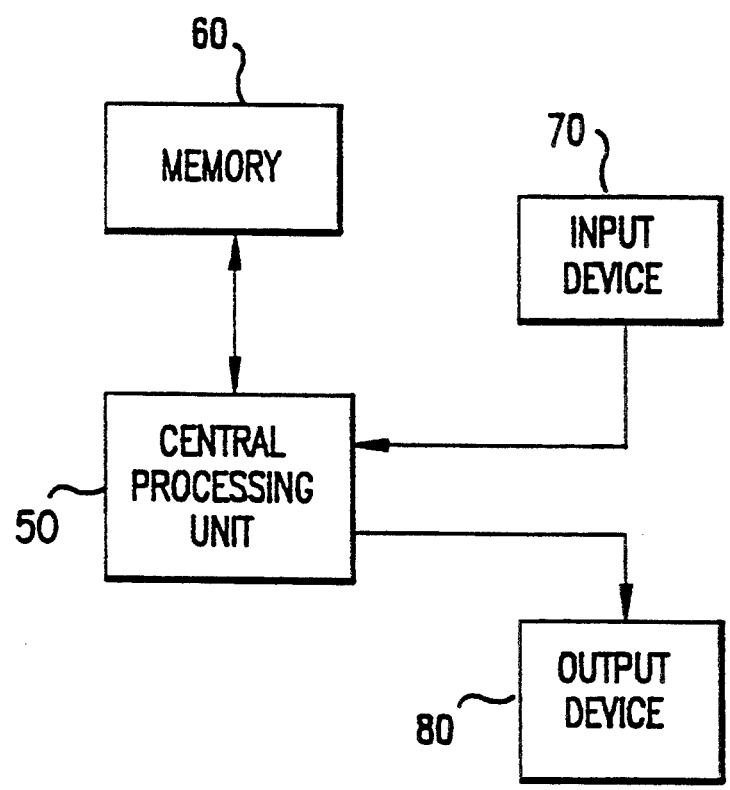
FIG. 28 is a block diagram of hardware useful with the present invention.

With this overview in hand, the entire sequencing phase may now be described with reference to FIGS. 23A–C. The following description refers to a number of sequencing procedures illustrated in flowcharts. These procedures can be implemented by running, for example, the source code attached as Appendix A in a computer system (a hardware block diagram of which is illustrated in FIG. 28). When executing this source code, this hardware functions as a sequencer or as a scheduler depending on whether the sequencing procedures of FIGS. 23A–C are being executed, or the scheduling procedures of FIG. 27 are being executed. Thus, the terminology sequencer or scheduler refers to a computer system performing the described sequencing or scheduling procedures, respectively.

The procedure illustrated in FIGS. 23A–23C uses the pop procedure and the third type of slide procedure described above. The sequencing procedure looks at vertices of the object in random fashion, and for each vertex determines whether any pop or slide actions should be performed. Basically, for each vertex, the procedure identifies concave edges which include that vertex, and then places the appropriate action (pop or slide) in an EXECUTE LIST if that action is determined to be geometrically safe (geometrical safety checking will be described below). When the EXECUTE LIST is completed, it will contain all the pops and slides necessary to convert the concave object to its convex hull. A scheduling procedure (described in the next section) is then used to determine when each action can be performed. This scheduling procedure permits actions to be performed in parallel (if possible), thus reducing the overall time required to convert the concave object to its convex hull.

The procedure of FIGS. 23A–C also includes a number of geometrical safety tests (to be described below) which can be used to determine whether a pop or slide action will produce undesirable effects, such as, for example, causing self intersections or degeneracies in the object. If one of these adverse effects would be created by a move, it is not (at least initially) added to the EXECUTE LIST.

Referring to FIG. 23A, first, a safety flag (SF) is initialized to zero. Then, in S100, each vertex in the polyhedron (the overall shape or object) is scanned. During this scan, any concave edges are flagged as such. Next, in S110, a list is built of all vertices contained in one or more of the flagged reflex edges.

Figure 24:
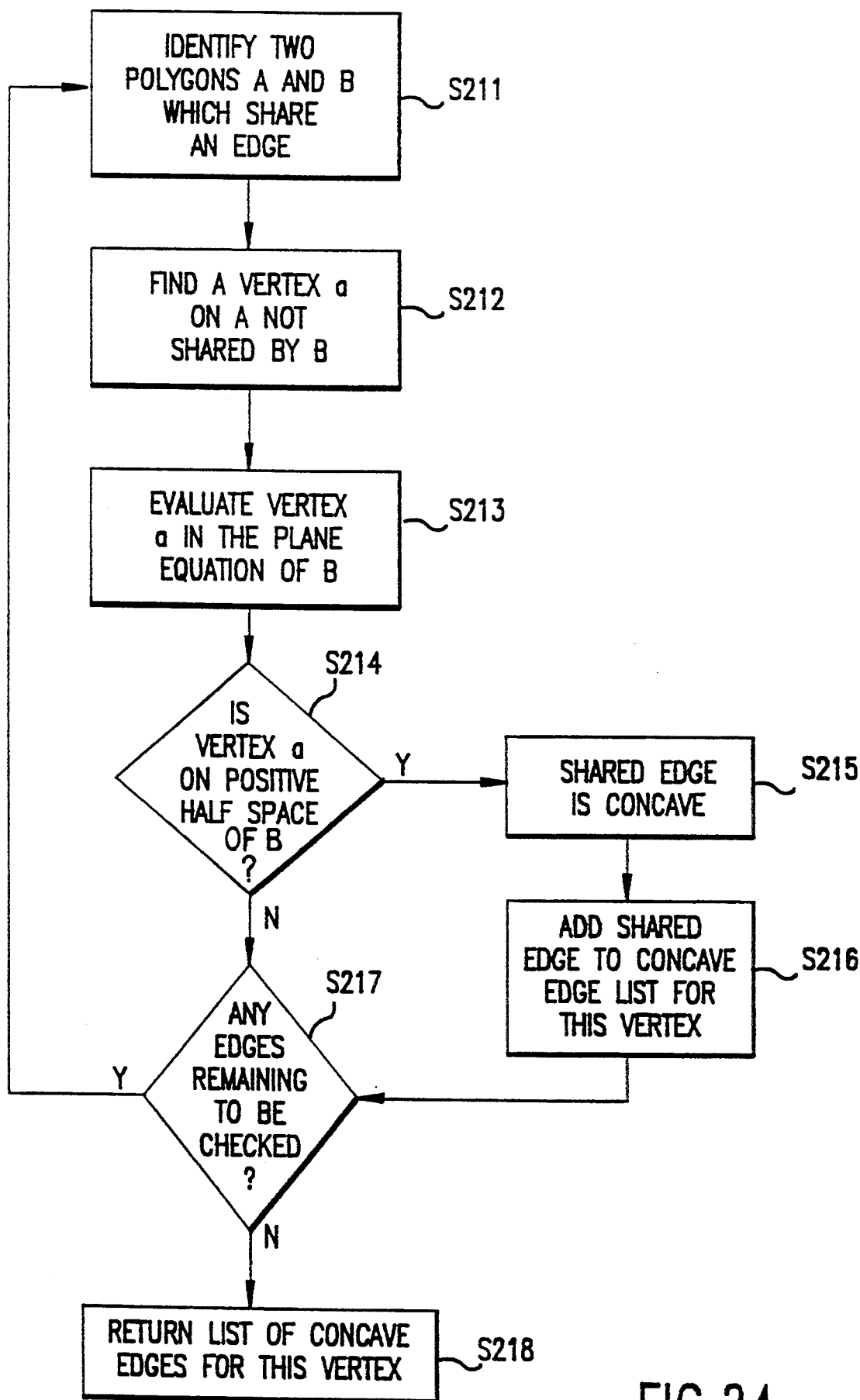
FIG. 24 is a flowchart illustrating a procedure for determining whether an edge is concave, for use in the procedure of FIGS. 23A–23C.

In S200, a vertex is selected from the list built in S110. The selection of a vertex from the list is random. In S210, a second list is then built containing all concave edges which include the vertex selected in S200. The procedure for constructing the list of concave edges for a vertex is illustrated in FIG. 24. First, in S211, identify two polygons (A and B) which share an edge having this vertex as one of its endpoints. Then, in S212, find a vertex $\alpha$ on A not shared by B. In S213 and S214, evaluate vertex $\alpha$ in the plane equation of B to determine whether $\alpha$ is on the positive half space of B. If the result of S214 is positive, mark the shared edge as concave (S215), add this concave edge to the concave edge list for this vertex (S216) and proceed to S217. If the result of S214 is negative, proceed to S217 and determine whether any edges remain to be checked for this vertex. This can be performed by determining whether any edges containing this vertex remain in a list of edges for the shape. Preferably, all edges containing a vertex are scanned in order until no edges remain. If unchecked edges remain, S211–S217 are repeated for the next edge. If no edges remain, the list of concave edges for this vertex is returned in S218.

Next, in S220 a determination is made as to whether any of the concave edges in the list built in S210 are part of a reflex prism. The procedure illustrated in FIG. 20 is used in S220. If none of the reflex edges for a vertex are in a reflex prism, flow proceeds to S600. If there are any reflex prisms, a determination is made in S300 as to whether any of the reflex prisms are geometrically safe.

Figure 25:
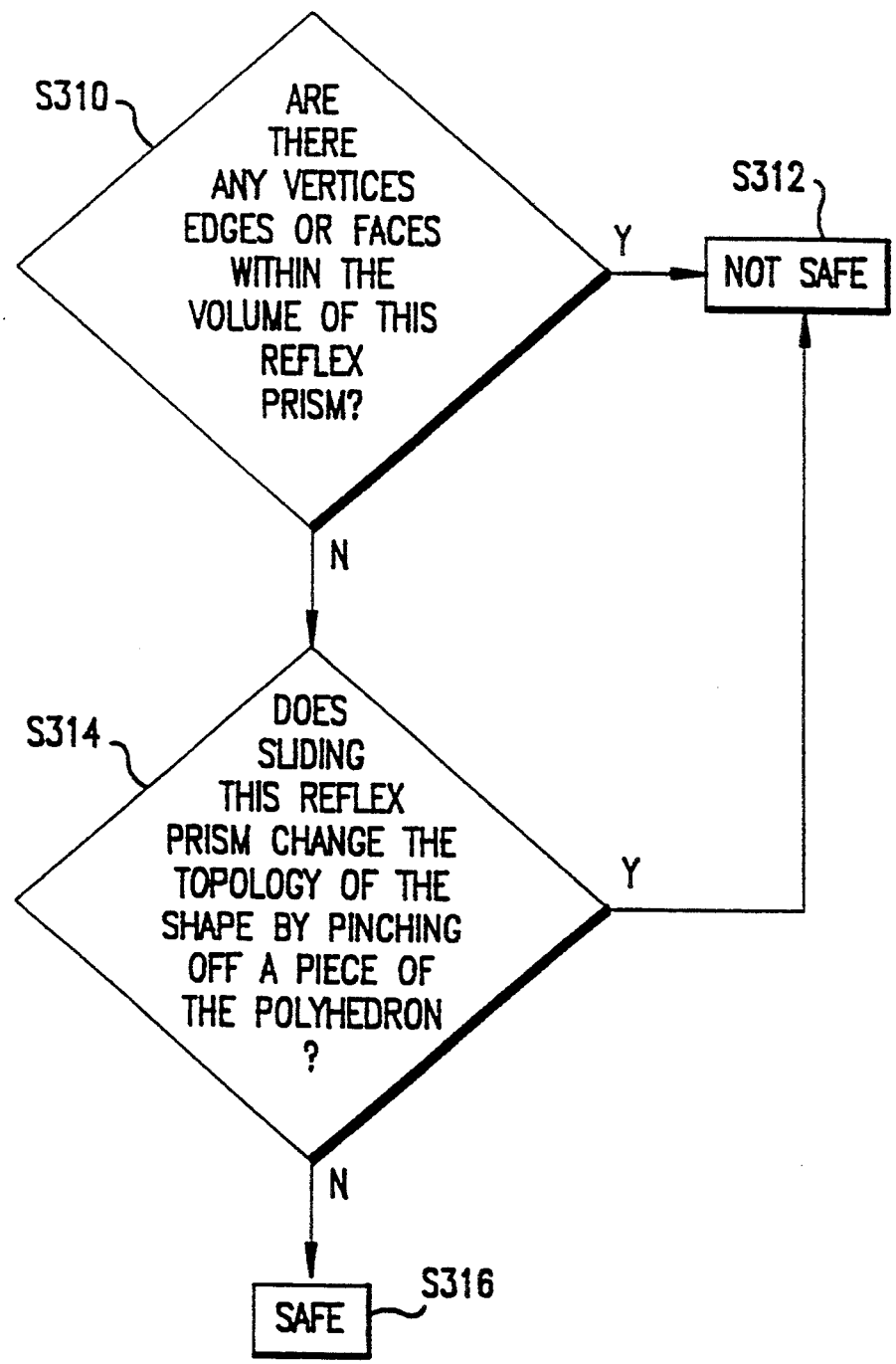
FIG. 25 is a flowchart illustrating a procedure for determining whether a reflex prism is safe for having a slide action applied thereto, for use in the procedure of FIGS. 23A–23C.

The geometrical safety test for reflex prisms is illustrated in FIG. 25. First, in S310, a determination is made as to whether there are any vertices, edges or faces within the volume of the reflex prism. This can be implemented by using conventional intersection tests which determine whether a particular action at any time intersects or interferes with the current shape. This test can be implemented efficiently with a three-dimensional grid and caching scheme. See the above-incorporated book by Preparata et al. If there is an intersection, the reflex prism is tagged as NOT SAFE in S312, and this result is returned to S300. If there are not intersections, flow proceeds to S314, where a determination is made as to whether sliding this reflex prism changes the topology of the shape by pinching off a piece of the polyhedron. This step prevents degeneracies from occurring. This determination can be made by comparing the new edge against all edges in the polyhedron as modified up to this time. The equation of the line containing this edge may be compared to the lines containing all other edges. If two edges are co-linear, an overlap test may be invoked. If either endpoint of either edge is contained within the other edge, the edges overlap; otherwise they do not. If the topology is changed, the reflex prism is tagged as NOT SAFE in S312 as described above. If the topology does not change, the reflex prism is tagged as SAFE in S316, and this result is returned to S300.

S300 is performed for all reflex prisms associated with the designated vertex so that all slide actions which can be performed are added to the EXECUTE LIST. If there are any geometrically safe prisms, flow proceeds to S400, where a slide action is performed. The procedure for performing the slide action is illustrated in FIG. 21. Whenever a slide action is performed, flow returns to S210 and the list of concave edges for that vertex is updated. If any reflex prisms remain which cannot be acted upon without violating the geometrical safety test illustrated in FIG. 25, flow proceeds to S305 where that slide action is skipped. Flow then proceeds to S600. Thus, in order to reach S600, no safe slide actions remain (i.e., no reflex prisms remain, or no SAFE reflex prisms remain). This automatically inserts any safe slide actions on the EXECUTE LIST as early as possible.

With reference to FIG. 23B, when no safe slide actions remain, a determination is made as to whether there are any untested reflex edges for this vertex (S600). If there are no remaining untested reflex edges for this vertex, flow proceeds to S630 where a determination is made as to whether all vertices in the list of vertices (created in S110) have been checked. If any vertices remain in this list, flow proceeds to S200. If all vertices have been checked, flow proceeds to S700. If there are any reflex edges remaining for the current vertex, flow proceeds to S610. In S610, a determination is made as to whether a reflex edge is safe to be popped.

Figure 26:
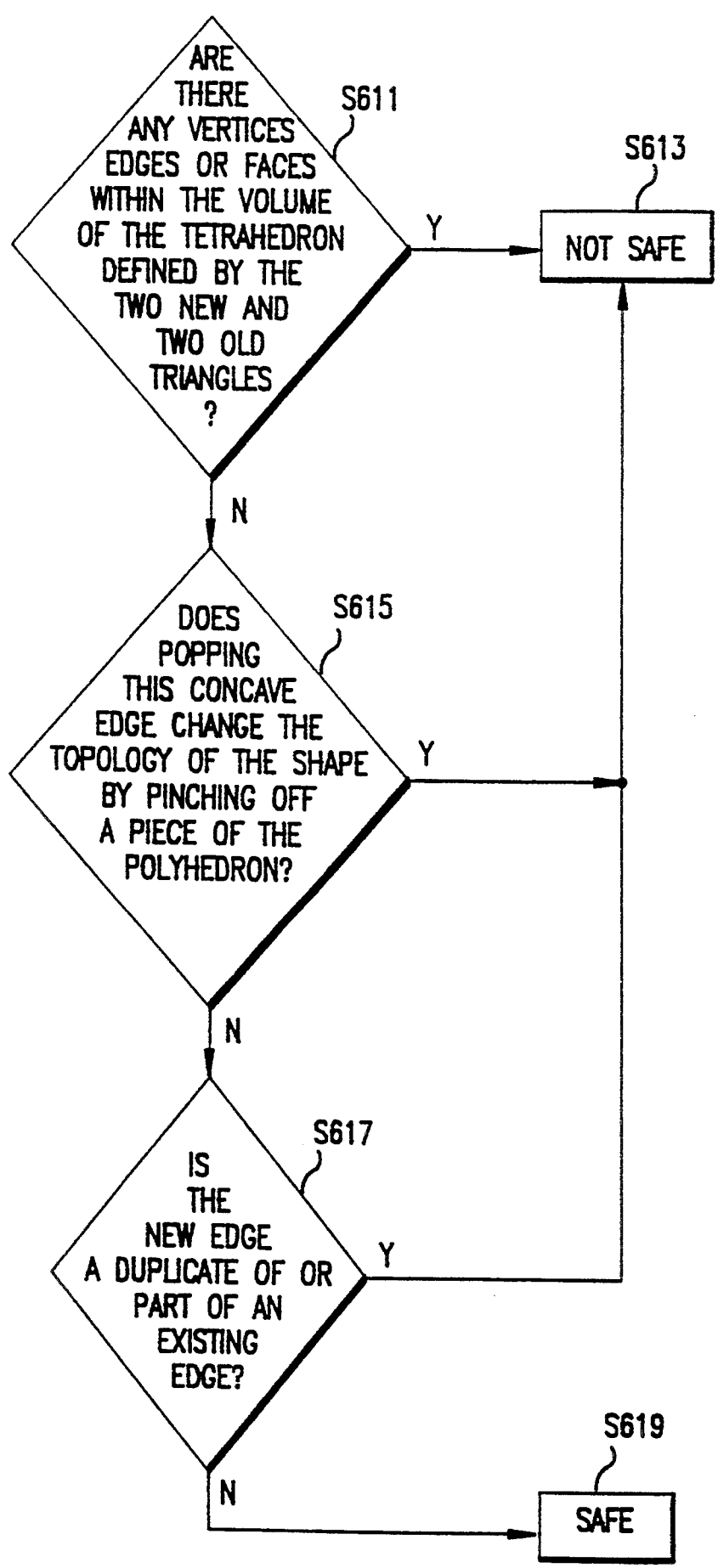
FIG. 26 is a flowchart illustrating a procedure for determining whether a concave edge is safe to be popped, for use in the procedure of FIGS. 23A–23C.

FIG. 26 illustrates a procedure for determining whether a reflex edge is safe to be popped. In S611, a determination is made as to whether there are any vertices, edges or faces within the volume of the tetrahedron defined by the two new and two old triangles involved in the pop action. This determination can be made in a manner similar to that described for S310 in FIG. 25. If the determination made in S611 is positive, the reflex edge is tagged as being NOT SAFE in S613. Otherwise, flow proceeds to S615 where a determination is made as to whether popping this concave edge changes the topology of the shape by pinching off a piece of the polyhedron. The determination made in S615 can be performed in a manner similar to that described with respect to S314 in FIG. 25. If the result of S615 is positive, the concave edge is tagged as NOT SAFE in S613, otherwise flow proceeds to S617, where a determination is made as to whether the new edge is a duplicate of or a part of an existing edge. This step prevents self intersections from occurring within the object. If the determination in S617 is positive, the reflex edge is tagged NOT SAFE, otherwise, the reflex edge is tagged SAFE in S619, and this result is returned to S610 in FIG. 23B.

Figure 16:
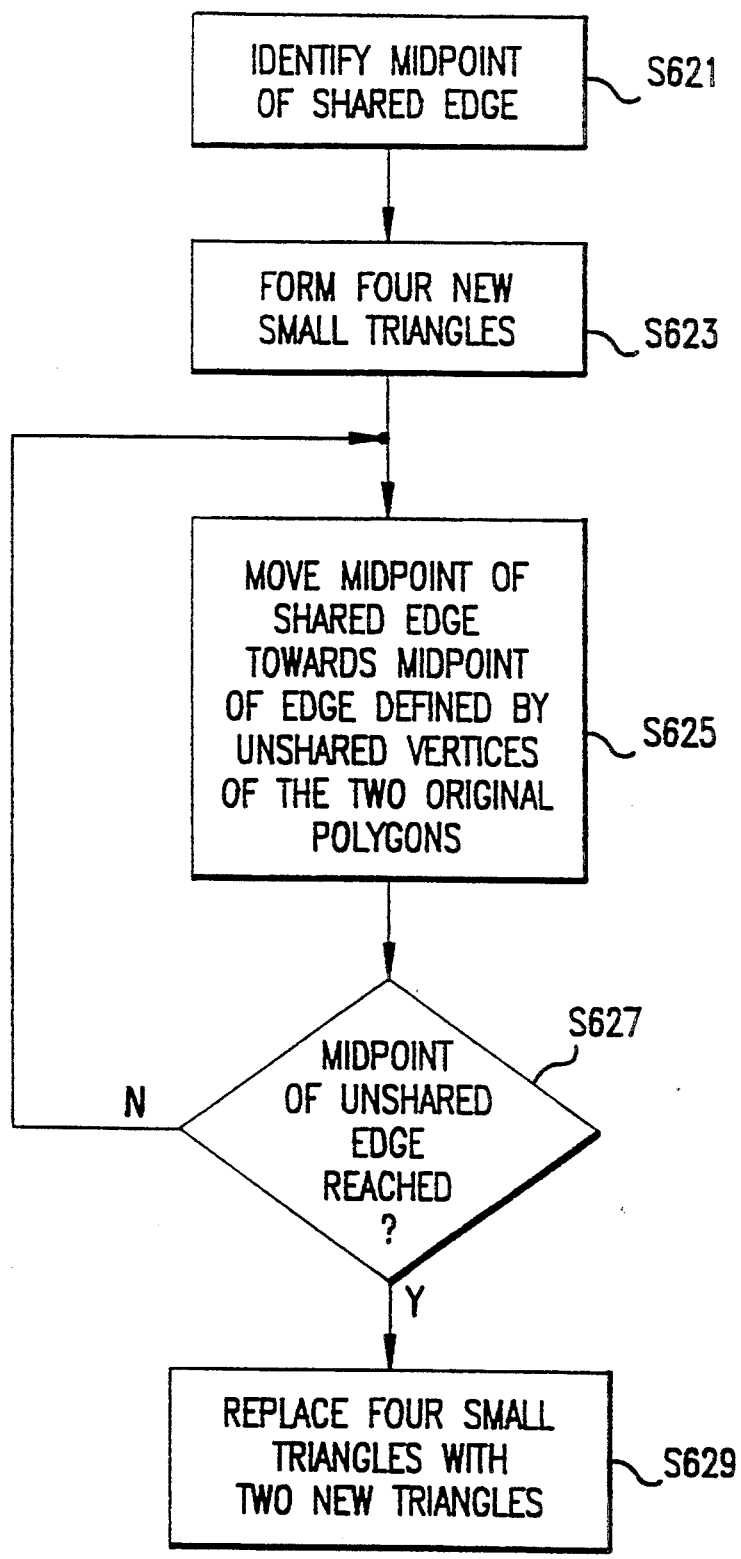
FIG. 16 is a flowchart illustrating a procedure for popping a concave edge.

If an edge is SAFE to be popped, the edge is popped using the procedure illustrated in FIG. 16. After an edge is popped, flow proceeds to S210 where the list of concave edges for this vertex is updated.

With reference to FIG. 23C, flow begins in S700. It will be recalled that S700 is reached when there are no safe pops or slides remaining in the object. This does not necessarily mean that the object has reached its convex hull. Thus, in S700 a determination is made as to whether there were any moves (pops or slides) during the last scan of the polyhedron (the entire object). If there have been any moves, flow returns to S100, where the entire object is scanned for reflex edges. If there were no moves since the last scan of the polyhedron, flow proceeds to S710. In S710, a determination is made as to whether they are any reflex edges remaining in the polyhedron. If there are no reflex edges remaining, the polyhedron has reached its convex hull, and in S720, the scheduling routine to be described with reference to FIG. 27 is performed. If any reflex edges do remain in the polyhedron, flow proceeds to S800. If flow reaches S800, there are no safe moves (pops or slides) remaining in the polyhedron. The value of the safety flag SF, is incremented by one in S800. In S810, a determination is made as to whether SF=1. If the determination in S810 is positive, flow proceeds to S820. In S820, the geometry safety tests are relaxed to allow included pieces of geometry. This results in S310 in FIG. 25 and S611 in FIG. 26 being skipped whenever a reflex prism or reflex edge is tested for safety. After relaxing this first safety test, flow proceeds to S100 where the entire procedure repeats itself. If flow reaches S830, there are no safe pops or slides in the concave shape even after relaxing the first geometry safety test. Accordingly, in S830, if SF=2, flow proceeds to S850, where the geometrical safety check is removed. S850 results in S314 and S615 being skipped in FIGS. 25 and 26. If the result of S830 is negative, flow proceeds to S840 where a message is provided to the user indicating that the initial polyhedron was ill formed. This message can be provided by, for example, a monitor or printer. This means that the initial polyhedron did not meet the requirements set forth earlier (genus O, simply-connected, etc.).

Thus, it is seen how the list of concave edges for a vertex is updated each time a slide action or a pop action is performed. It is understood that the flowchart of FIGS. 23A–C, adds the pop or slide action to the EXECUTE LIST.

When the concave polyhedron input to the concave-to-convex procedure described above meets the prerequisites described above, an EXECUTE LIST containing a series of pops and slides will be output which, if executed will result in the conversion of the concave shape to its convex hull.

The above-described sequencing procedure is a preferred method for building the EXECUTE LIST. By using the disclosed geometrical safety tests (FIGS. 25 and 26), actions which cause self-intersections, degeneracies, changes in topology, or other undesirable effects are delayed as long as possible. Frequently moves which were initially deemed UNSAFE become SAFE due to changes in the portions of the object surrounding the edge associated with that move. Sometimes UNSAFE concave edges become convex due to actions on edges surrounding them.

As an alternative to the above-described sequencing procedure, a scoring technique can be used to rank moves according to a scoring scheme designed by the user. A user could thus control the overall look of the metamorphosis by custom designing a scoring scheme. One example of a scoring technique will now be briefly described.

This scored sequencing procedure outputs an EXECUTE LIST as above, although the list is determined by a different method, and thus may result in a metamorphosis that looks different (although the final convex hull will be the same). This sequencing procedure:
a) first builds a PENDING LIST of potential actions (pops and slides); b) scores each action on the PENDING LIST based on a user-determined scoring scheme; c) selects the highest scored action from the PENDING LIST, places it on the EXECUTE LIST, and executes that action; d) if any new concave edges are formed by the action, they are added to the PENDING LIST; e) all actions in the PENDING LIST are rescored to emphasize actions close to the one just executed; and then steps (a)–(e) are repeated until no actions remain on the PENDING LIST. The actions on the EXECUTE LIST are then assigned start and end times in accordance with the procedures described below in the scheduling section.

This scoring technique is useful when the user desires to have more control over the look of the metamorphosis. The following is one example of a scoring scheme which can be used. This illustrative scoring strategy starts performing actions on concave edges closest to the center of the shape, and seeks actions that move far or close-up a big hole, both of which have a large visual effect. This strategy also attempts to perform slides as soon as possible, and attempts to complete all work necessary in one location before moving on to another part of the shape.

To score the actions in the PENDING LIST for the first time, score each move with the following formula: score0=(1*position)+(2*movement)+(3 * type)+(2 * angle)+(−50 * intersection), where "position" is given by ratio of the average distance to the shape's center of all vertices of all polygons in the action, divided by the radius of the shape's bounding sphere, "movement" is the distance covered by the moving vertex in the action divided by the diameter of the shape's bounding sphere, "type" is 1 for a pop and 0 for all other actions, "angle" is 0 for all actions but pop, where it is $(1 - \cos \theta)/2$, where $\cos \theta$ is the cosine of the angle formed by the two original planes, and "intersection" is 0 if the action does not intersect the shape and 1 if it does (i.e., it fails the geometrical safety tests described earlier).

After the first action on the PENDING LIST has been executed, it may be desirable to emphasize actions that occur near that action. This causes shapes to "unwrap" from the starting action. This also tends to avoid situations that force self-intersections. These are examples of a value decision incorporated into the scheduler via the design of the scoring function. To realize these goals, all further scoring uses the formula: score1=-score0+history. When a pop constructs new polygons, the indices of the new polygons are pushed onto a stack. To score a slide, the stack is searched bottom-up for the polygon index of the sliding polygon (i.e., the moving polygon or vertex depending on the type of slide action used). To score a pop, the stack is searched bottom-up for the first mention of either of the polygons involved in the pop. This mechanism allows the scheduler at each step to detect moves which build on the performed actions. For example, assume that b is an element farthest down in the stack that was found for any action, and w is the stack position for any action (w is the height of the stack if no action is found); for any action, history=MAX[0,30−(5*(b−w))]. This illustrative procedure favors moves where the polygons have existed for a long time; the longer a move has waited, the higher that move's score.

IIC. Scheduling

Once the EXECUTE LIST has been built, the form and order of the actions that smoothly transform a concave shape to its convex hull is known. The only remaining issue is the timing of these actions: when each action begins and ends. As with the sequencing strategy, each scheduling procedure has its own "look" though the effect is usually less pronounced than the choice of scheduler.

Suppose that the transformation from concave shape to convex hull is described by a scalar parameter c, which sweeps from 0 to some maximum value. Each action $a^i$ has two timing values: $a^i_{start}$ and $a^i_{end}$. The first action on the EXECUTE LIST begins at time 0. To find the duration of a move, look at the total distance covered by the moving vertex. For scheduling purposes, a simple rule can be used: all moving vertices move at constant, unit speed. Thus the time taken by an action is simply the distance covered by the moving vertex. Alternatives are also visually meaningful: for example, a vertex could move at a speed proportional to the distance it needs to cover. Again, different criteria here give different looks to the final transformation.

The simplest scheduling technique simply walks through the EXECUTE LIST, assigning $a^i_{start} \leftarrow a^{i-1}_{end}$, and $a^i_{end} \leftarrow a^i_{start} + a^i_{duration}$. This schedule guarantees that there will be no new conflicts or self-intersections that were not originally accepted by the sequencer.

FIG. 27 illustrates one procedure for scheduling the start times of each move. This scheduling procedure emphasizes parallelism by attempting to assign an earliest possible starting time to each action.

The list of moves determined by the sequencer (the EXECUTE LIST) is input to the scheduler. Then, in S900, a start time of 0 is assigned to the first move in the EXECUTE LIST. Thus, $a^1_{start}=0$. In S910, the duration of the first move $d^1$ is determined as described above. In S920, the end time for the first move $a^1_{end}$ is determined as $a^1_{start}+d^1$. Next, in S1000, the next untimed move (i) on the EXECUTE LIST is selected. In S1010 a determination is made as to whether this move existed at time $t=0$. If the result of S1010 is positive, a start time $a^i_{start}=0$ is assigned to move i. Then, in S1050 and S1060 the duration $d^i$ and end time $a^i_{end}$ are determined as discussed above. Flow then proceeds to S1070 where a determination is made as to whether all moves in the EXECUTE LIST have been timed. If the result of S1070 is NO, return to S1000 and selected the next move. If the result of S1070 is positive, proceed to S1080 where timing is complete. In S1080 the start and end times can be scaled so that the start time of the first move $a^1_{start}=0$ and the end time of the last move $a^{last}_{end}=1$.

If the result of S1010 is negative, flow proceeds to S1030. In S1030 the move X which created the polygons involved in the move i being timed is found. Since the sequencing procedure produced the EXECUTE LIST, it is guaranteed that move X has already been timed. Then in S1040, the end time of move X ($a^x_{end}$) is assigned as the start time of move i ($a^i_{start}$). Flow then proceeds to S1050.

III. Orchestration

The convex-to-convex and concave-to-convex procedures discussed above can be implemented by running the source code attached as Appendix A on a hardware system, such as the system illustrated by block diagram in FIG. 28. The system includes a memory 60 including ROM and RAM in which a program illustrated in FIGS. 8, 14, 16, 20, 21, 23A-27 and provided in Appendix A is stored and run. The data describing the three-dimensional shapes is input with input device 70 and also stored in memory 70. Output device 80 can include, for example, a video monitor and/or a printer for outputting prompts to a user, or displaying snapshots or video sequences (if output device 80 is a video monitor) of a metamorphosis. The entire system is controlled by central processing unit (CPU) 50 by running the program stored in memory 60. The program in Appendix A is written in Cedar programming language.

To interpolate from one concave shape to another concave shape, the techniques of Sections I and II are orchestrated into a single procedure. There are three basic steps, the visual outputs of which are shown schematically in FIGS. 29A-D: first, generate concave-to-convex metamorphs for the start shape (FIGS. 29A-29B); second, transform the convex hull of the start shape to the convex hull of the goal shape (FIGS. 29B-29C); third, generate convex-to-concave metamorphs for the goal shape (FIGS. 29C-29D). The metamorphs in steps 1 and 3 are created by the same procedure (described in Section II). To create a shape at any point along its concave-convex continuum, one need only specify a real number between 0 and 1. The procedure starts with the concave shape, and applies all moves that end before that time. All actions that are still active at that time are executed at the proper interpolated position. To go from convex to concave, simply sweep the parameter from 1 to 0.

As mentioned earlier, although timing is determined as though all vertices moved at the same constant speed, an easing curve can be used to eliminate the sudden, jerky starts and stops that would otherwise be produced. For example, one would use a form of the sigmoid function, $f(t,a)=1/(1+(\exp(-(2t-1)a)))$ (valid for $a>0$), which provides a greater range of control than a cubic. This function can be scaled to unit range, giving $g(t,a)=(f(t,a)-f(0,a))/(f(1,a)-f(0,a))$.

Figure 30:
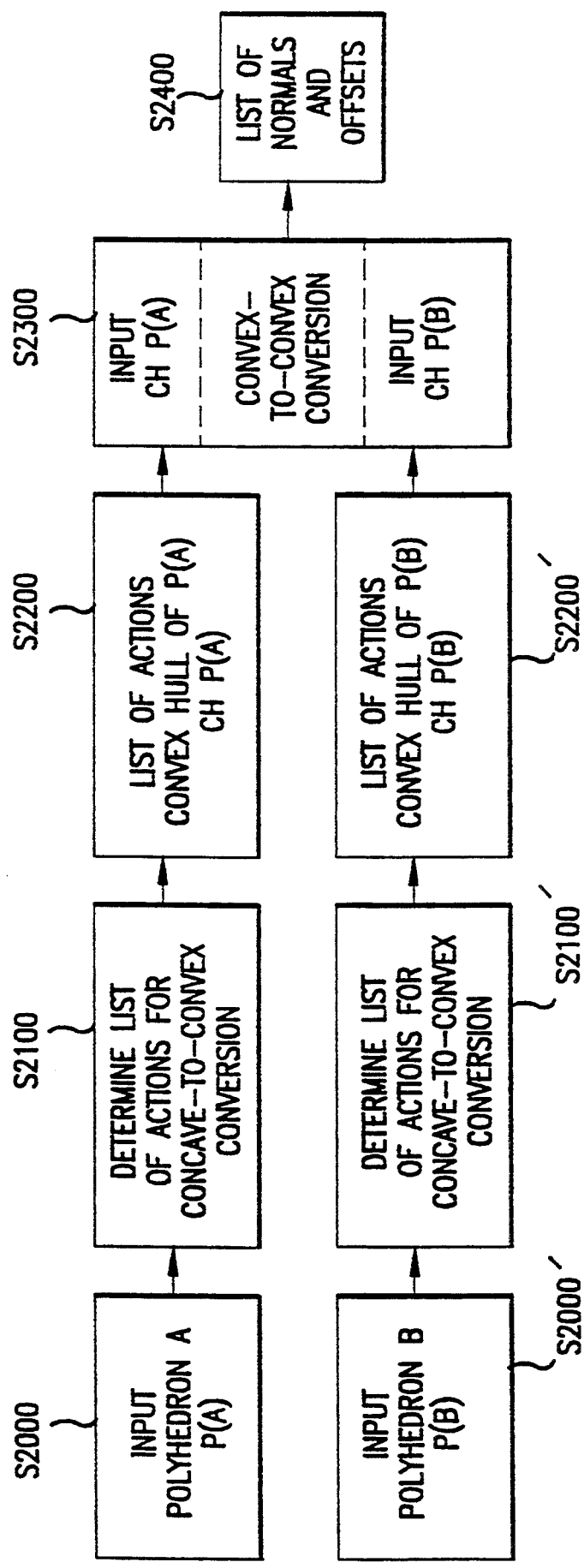
FIG. 30 is a high level flowchart illustrating a metamorphosis between two polyhedra.

FIG. 30 is a high level flow chart of the overall procedure for converting one concave shape P(A) to another concave shape P(B). The concave polyhedra P(A) and P(B) are separately input in S2000 and S2000'. In S2100 and S2100', timed lists of actions (pops and slides) are determined for converting each shape to its convex hull CHP(A) and CHP(B). The results of the concave-to-convex conversions are illustrated in S2200 and S2200' respectively, as two lists of timed actions and two convex hulls CHP(A) and CHP(B). In S2300, the convex-to-convex conversion procedure is executed on the two input convex hulls so as to generate a list of normals and offsets (two offsets for each normal) as illustrated in S2400. Thus three lists are generated (S2200, S2200' and S2400) which can be processed by conventional animation programs to generate three-dimensional shapes. These three-dimensional shapes can then be displayed as images on, for example, a video display screen using standard rendering programs. The three lists can be executed sequentially or simultaneously as described below.

The simplest orchestration applies the three component steps (P(A)→CHP(A); CHP(A)→CHP(B); and CHP(B)→P(B)) in sequence, as shown in FIG. 31A. The first step begins at 0 and the third ends at time 1. The user specifies the start and end of the second step, which are also the end of the first and start of the third, respectively. If either shape is already convex then its concave/convex step duration may be set to 0.

A smoother transition may be made by overlapping the steps. The most general form of overlapping gives the user control over four times, as shown in FIG. 31B: the ends of the first and second step, and the starts of the second and third step. If two or more steps overlap at a particular time, then the result at that time is the intersection of the involved polyhedra. Note that this may require finding the intersection of multiple, non-convex polyhedra. The most extreme example of this timing is shown in FIG. 31C, where each step occupies the entire time interval.

The primary goal of the present invention is to create a visually appealing automatic metamorphosis technique. A useful class of properties has been distinguished, and the disclosed procedures produce interesting metamorphs of three-dimensional shapes. The method presented here is not universal: it is limited to simply-connected triangular mesh polyhedra of genus O.

The scheduler presented above is not ideal, since it can generate self-intersections in metamorphs even when each boundary shape is free of them. The history technique described attempts to handle actions that intersect the shape by delaying them.

A user may enforce some implicit feature matching with a slightly expanded version of the procedure. Consider the transformation of a horse to a dog: both have four independent feet. The basic procedure presented above would first grow the horse to its hull, losing the definition of the feet, transform to the dog's hull, and then recover the feet when returning to the concave goal shape. To retain four independent feet throughout, one could superimpose the start and goal shapes for the purposes of metamorphosis. Each constructed metamorph may then be moved and scaled back into place by an increasing weighted inverse transform. The procedure starts by finding the union shape: the CSG union of the superimposed start and goal shapes. Then each metamorph is intersected with this union shape. If the user has a full range of linear transformations available for creating the initial superposition of the boundary shapes, then like features may be superimposed, and they will retain their individual identity during the transformation. In the example above, the body would change while the four legs changed subtly from one animal to the other, rather than being swallowed up by the hull and then reappearing. The metamorphs would shrink from horse- to dog-sized as the interpolation proceeded.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A computer method for modifying a shape, said shape stored as electronic data signals which represent said shape as a simply connected, triangulated polyhedron forming a single closed surface, defined as a plurality of triangular faces, each triangular face defined as a set of three coordinate points, said method comprising:
  a) identifying said electronic data signals that represent a concave edge in said shape, said concave edge being located between two adjacent triangular faces and defining a shared edge having two shared vertices of said two adjacent triangular faces; and
  b) converting said electronic data signals representing said identified concave edge into converted data signals, said converted data signals resulting in conversion of said two adjacent triangular faces into two converted triangular faces, said two converted triangular faces having a common shared edge which is convex and defined by two converted shared vertices, said two converted shared vertices corresponding to two unshared vertices of said two adjacent triangular faces prior to said converting, said two converted triangular faces having two unshared vertices which correspond to the shared vertices of said two adjacent triangular faces prior to said converting.

2. The method of claim 1, further comprising: repeating steps (a) and (b) after said converting to identify and eliminate any new concave edges created by said converting.

3. The method of claim 1, wherein said converting comprises:
  i) identifying a midpoint of said concave edge to be converted, said midpoint located centrally between said shared vertices of the two adjacent triangular faces which define said concave edge;
  ii) creating a temporary vertex at said concave edge midpoint;
  iii) converting said two adjacent triangular faces into four temporary triangular faces defined by said shared and unshared vertices of said two adjacent triangular faces and said temporary vertex;
  iv) moving said temporary vertex to a coordinate position corresponding top a second midpoint, said second midpoint located centrally between said two unshared vertices of said adjacent triangular faces, the shapes and positions of said four temporary triangular faces changing as said temporary vertex is moved, until said four temporary triangles are defined by said shared and unshared vertices of said converted adjacent triangular faces and said second midpoint; and
  v) eliminating said temporary vertex and converting said moved four temporary triangular faces into said two converted triangular faces.

4. The method of claim 3, wherein said temporary vertex is moved along a straight line between said concave edge midpoint and said second midpoint.

5. The method of claim 1, wherein said shape defines a three-dimensional shape.

6. The method of claim 1, further comprising:
  c) displaying the modification of said shape as an image on a video display screen.

7. The method of claim 1, further comprising:
  c) determining whether the converted data signals representing either of said converted triangular faces corresponds to data signals of a third triangular face of said image after performing said converting; and
  eliminating the converted data signals representing any converted triangular face which is determined to correspond to said third face, and also eliminating the converted data signals representing said third face.

8. The method of claim 1, further comprising:
  c) determining whether the two triangular faces which share a concave edge to be converted also share a common third triangular face; and
  d) converting the data signals representing said two triangular faces which share said concave edge, said shared common third triangular face, and a common vertex shared by said shared common third triangular face and said two triangular faces sharing said concave edge into converted data signals representing a fourth triangular face when said shared common third triangular face is determined to exist, said fourth triangular face defined by three vertices not shared by said replaced triangular faces, otherwise performing said converting.

9. The method of claim 8, wherein step (d) includes:
  i) replacing the data signals representing said common vertex with temporary data signals representing a temporary vertex;
  ii) replacing the data signals representing said two triangular faces which share said concave edge and said shared common third triangular face with temporary data signals representing three temporary triangular faces, each temporary triangular face defined by said temporary vertex and an edge from a corresponding one of said replaced triangular faces which is not shared by any two of said replaced triangular faces;
  iii) moving said temporary vertex toward a plane defined by said three vertices not shared by all of said replaced triangular faces, said three temporary triangular faces moving as said temporary vertex moves; and iv) replacing the temporary data signals representing said temporary vertex and said three temporary triangular faces with the converted data signals representing said fourth triangular face when said temporary vertex reaches said plane.

10. The method of claim 1, wherein step (a) includes:
i) selecting data signals representing first and second adjacent triangular faces by determining that said first and second triangular faces share two vertices;
ii) evaluating a vertex of said first triangular face which is not contained in said second triangular face, in a plane equation of said second triangular face; and
iii) determining that an edge defined by said two shared vertices is concave when a result of the evaluation in step (ii) is positive.

11. A computer method for modifying a shape, said shape stored as electronic data signals which represent said shape as a simply connected, triangulated polyhedron forming a single closed surface, defined as a plurality of triangular faces, each triangular face defined as a set of three coordinate points, said method comprising:
a) identifying said electronic data signals that represent a concave edge in said shape, said concave edge being located between two adjacent triangular faces and defining a shared edge having two shared vertices of said two adjacent triangular faces;
b) determining whether the two triangular faces which share said concave edge also share a common third triangular face; and
b) converting the electronic data signals representing said two triangular faces which share said concave edge, said shared common third triangular face, and a common vertex shared by said shared common third triangular face and said two triangular faces which share said concave edge into converted data signals representing a fourth triangular face when said shared common third triangular face is determined to exist, said fourth triangular face defined by three vertices not shared by all of said replaced triangular faces.

12. The method of claim 11, wherein step (c) includes:
i) replacing the data signals representing said common vertex with temporary data signals representing a temporary vertex;
ii) replacing the data signals representing said two triangular faces which share said concave edge and said shared common third triangular face with temporary data signals representing three temporary triangular faces, each temporary triangular face defined by said temporary vertex and an edge from a corresponding one of said replaced triangular faces which is not shared by any two of said replaced triangular faces;
iii) moving said temporary vertex toward a plane defined by said three vertices not shared by all of said replaced triangular faces, said three temporary triangular faces moving as said temporary vertex moves; and
iv) converting the temporary data signals representing said temporary vertex and said three temporary triangular faces into the converted data signals representing said fourth triangular face when said temporary vertex reaches said plane.

13. The method of claim 11, wherein step (a) includes:
i) selecting data signals representing first and second adjacent triangular faces by determining that said first and second triangular faces share two vertices;
ii) evaluating a vertex of said first triangular face which is not contained in said second triangular face, in a plane equation of said second triangular face; and
iii) determining that an edge defined by said two shared vertices is concave when a result of the evaluation in step (ii) is positive.

14. The method of claim 11, wherein said temporary vertex is moved along a straight line between said concave edge midpoint and said second midpoint.

15. The method of claim 11, wherein said shape defines a three-dimensional shape.

16. The method of claim 15, further comprising:
c) displaying the modification of said shape as an image on a video display screen.

* * * * *